(12) United States Patent
Lin

(10) Patent No.: US 8,503,079 B2
(45) Date of Patent: Aug. 6, 2013

(54) PARALLAX BARRIER 3D IMAGE DISPLAY METHOD

(75) Inventor: Ming-Yen Lin, Taipei (TW)

(73) Assignee: Unique Instruments Co.Ltd, Taipei (TW)

( * ) Notice: Subject to any disclaimer, the term of this patent is extended or adjusted under 35 U.S.C. 154(b) by 339 days.

(21) Appl. No.: 12/870,067

(22) Filed: Aug. 27, 2010

(65) Prior Publication Data

US 2011/0051240 A1    Mar. 3, 2011

(30) Foreign Application Priority Data

Aug. 28, 2009    (TW) .............................. 98128986 A

(51) Int. Cl.
*G02B 27/22*    (2006.01)

(52) U.S. Cl.
USPC .......................................................... 359/464

(58) Field of Classification Search
USPC ................................ 359/462–465; 348/42–60
See application file for complete search history.

(56) References Cited

U.S. PATENT DOCUMENTS

| | | | |
|---|---|---|---|
| 2007/0165305 A1* | 7/2007 | Mehrle | ........................ 359/464 |
| 2008/0117233 A1* | 5/2008 | Mather et al. | ................. 345/690 |

* cited by examiner

*Primary Examiner* — Zachary Wilkes
(74) *Attorney, Agent, or Firm* — WPAT, PC; Justin King

(57) ABSTRACT

A parallax barrier 3D image display method is provided. Particularly, a vertical strip parallax barrier design method is provided to avoid transverse ghost images generated by a conventional parallax barrier and directed to arrangement of sub-pixels on a screen of a flat panel display, which displays multi-view 3D images with minimal ghost images, thereby achieving the purpose of optimum 3D image display.

9 Claims, 25 Drawing Sheets

| C'/P | 2b/P | n | $\Delta x'_c/P$ | R' | $L'_S/2(mm)$ | $\Delta x'_c(mm)$ | $\Delta x_{BM}(mm)$ | $\Delta x_G(mm)$ |
|---|---|---|---|---|---|---|---|---|
| 0.5 | 0.5 | 1.0 | 0.5 | 1.00 | 35.0 | 0.000 | 35.00 | 0.00 |
| 0.6 | 0.4 | 1.0 | 0.4 | 0.67 | 35.0 | 7.000 | 28.00 | 0.00 |
| 0.6 | 0.4 | 1.5 | 0.6 | 1.00 | 42.0 | 0.000 | 28.00 | 14.00 |
| 0.7 | 0.3 | 1.0 | 0.3 | 0.43 | 35.0 | 14.000 | 21.00 | 0.00 |
| 0.7 | 0.3 | 1.5 | 0.5 | 0.64 | 40.3 | 8.750 | 21.00 | 10.50 |
| 0.7 | 0.3 | 2.0 | 0.6 | 0.86 | 45.5 | 3.500 | 21.00 | 21.00 |
| 0.8 | 0.2 | 1.0 | 0.2 | 0.25 | 35.0 | 21.000 | 14.00 | 0.00 |
| 0.8 | 0.2 | 1.5 | 0.3 | 0.38 | 38.5 | 17.500 | 14.00 | 7.00 |
| 0.8 | 0.2 | 2.0 | 0.4 | 0.50 | 42.0 | 14.000 | 14.00 | 14.00 |
| 0.8 | 0.2 | 2.5 | 0.5 | 0.63 | 45.5 | 10.500 | 14.00 | 21.00 |
| 0.8 | 0.2 | 3.0 | 0.6 | 0.75 | 49.0 | 7.000 | 14.00 | 28.00 |
| 0.8 | 0.2 | 3.5 | 0.7 | 0.88 | 52.5 | 3.500 | 14.00 | 35.00 |
| 0.8 | 0.2 | 4.0 | 0.8 | 1.00 | 56.0 | 0.000 | 14.00 | 42.00 |
| 0.9 | 0.1 | 1.0 | 0.1 | 0.11 | 35.0 | 28.000 | 7.00 | 0.00 |
| 0.9 | 0.1 | 2.0 | 0.2 | 0.22 | 38.5 | 24.500 | 7.00 | 7.00 |
| 0.9 | 0.1 | 3.0 | 0.3 | 0.33 | 42.0 | 21.000 | 7.00 | 14.00 |
| 0.9 | 0.1 | 4.0 | 0.4 | 0.44 | 45.5 | 17.500 | 7.00 | 21.00 |
| 0.9 | 0.1 | 5.0 | 0.5 | 0.56 | 49.0 | 14.000 | 7.00 | 28.00 |
| 0.9 | 0.1 | 6.0 | 0.6 | 0.67 | 52.5 | 10.500 | 7.00 | 35.00 |
| 0.9 | 0.1 | 7.0 | 0.7 | 0.78 | 56.0 | 7.000 | 7.00 | 42.00 |
| 0.9 | 0.1 | 8.0 | 0.8 | 0.89 | 59.5 | 3.500 | 7.00 | 49.00 |
| 0.9 | 0.1 | 9.0 | 0.9 | 1.00 | 63.0 | 0.000 | 7.00 | 56.00 |

FIG. 20

PARALLAX BARRIER 3D IMAGE DISPLAY METHOD

BACKGROUND OF THE INVENTION

1. Field of Invention

The present invention relates to a parallax barrier 3D image display method, and more particularly to a vertical strip parallax barrier design method to avoid transverse ghost images generated by a conventional parallax barrier and directed to arrangement of sub-pixels on a screen of a flat panel display, which displays multi-view 3D images with minimal ghost images, thereby achieving the purpose of optimum 3D image display.

2. Related Art

FIG. 1 is a schematic view of a conventional vertical strip parallax barrier. The basic optical structure of the vertical strip parallax barrier 10 is formed of vertical strip light-transmissive elements 11 (provided with a horizontal width $B_0$ and a vertical height H) and vertical strip shielding elements 12 (provided with a horizontal width $\overline{B_0}$ and a vertical height H). The light-transmissive elements 11 and the shielding elements 12 are arranged alternately in a horizontal direction, so as to form a parallax barrier active region 15 having an area of W×H.

Directed to the vertical strip parallax barrier 10, FIG. 2 is a schematic view of a conventional multi-view 3D image (hereinafter, the 4-view is illustrated as an example). The 4-view 3D image 20 is usually displayed by a screen of a flat panel display (e.g., LCD, Plasma, or OLED display). The screen of the flat panel display is formed of (M+1)×(N+1) sub-pixel units 21, and a single sub-pixel unit 21 has a P×h image display area. Thus, the maximum image display area of the 4-view 3D image 20 is W'×H', in which W'=P(M+1), H'=h(N+1). In practical design, generally W~W' and H~H'.

Additionally, the 4-view 3D image 20 is formed by the arrangement of 4 view images $V_{j,i}$ having equal parallax effect. Here, V indicates the number of a view and $0 \leq V \leq 3$; i,j are positions of the sub-pixel units 21 and $0 \leq i \leq M$, $0 \leq j \leq N$. In the arrangement method, on any horizontal line (e.g., j=j'), the 4-view image arrangement $V_{j,i}$ is in unit of sub-pixels and formed by sequentially filling the view image $k_{j',4m+k}$ at a position i according to the rule of i=4 m+k (m is a positive integer including 0 and k=0~3). Further, on any vertical line (e.g., i=i', where i'=4m×k, m is a positive integer including 0 and k=0~3), the 4-view image arrangement $V_{j,i}$ is in unit of sub-pixels and formed by sequentially filling the view image $k_{j,i'}$ on a column i' of the same k-view image at a position j.

Due to characteristics of the optical structure of the vertical strip parallax barrier 10, the vertical strip light-transmissive elements 11 and the vertical strip shielding elements 12 in the structure realize the effect of separating the multi-view 3D image only in the horizontal direction through the light transmission and shielding function. Therefore, it only needs to study a single horizontal structure for analyzing the optical characteristics.

FIG. 3 is a schematic view of the display principle of a conventional 4-view parallax barrier 3D image display.

The 4-view image $V_{i,j}$ is in unit of sub-pixels and arranged on a display screen 100 (for ease of illustration, only a part of the image on the horizontal line is shown and $V_0, V_1, V_2, V_3$ are used to replace $V_{i,j}$). Through the function of the 4-view parallax barrier 110, the 4-view images $V_0, V_1, V_2, V_3$ can be observed at four best viewing points $P_0, P_1, P_2, P_3$ (let $L_V$ be the distance between the best viewing points) on an optimum viewing distance $Z_0$. Therefore, as long as eyes 120, 121 (with an eye interval of $L_E$) of a viewer are located at any two neighboring best viewing points (in a relation of $L_E=L_V$), the viewer may observe a perfect 3D image. The coverage of the four best viewing points $P_0, P_1, P_2, P_3$ forms a viewing zone. Hence, the function of the parallax barrier is to completely separate the view of the multi-view 3D image at the four best viewing points $P_0, P_1, P_2, P_3$ on the optimum viewing distance. Additionally, the distance $L_V$ of the best viewing points is defined by the following formula:

$$L_V = \frac{P}{P - B_0} B_0 \qquad (1)$$

where $B_0$ is a width of the light-transmissive elements and P is a width of a sub-pixel.

The optimum viewing distance $Z_0$ (the distance to the display screen 100) is defined by the following formula:

$$Z_0 = \frac{P}{P - B_0} L_B \qquad (2)$$

where $L_B$ is the installation distance for the parallax barrier 110 (the distance to the display screen 100).

The theory for deducing Formulae (1) and (2) may refer to the following paper:

"Theory of Parallax Barriers", Sam H. Kaplan, Vol. 59, Journal of the SMPTE, 1952.

The paper issued by Kaplan in 1952 discloses the calculation of Formulae (1) and (2), but does not discuss the ghost image phenomenon and the optimum design of the parallax barrier. So far, although ROC Patent No. 097135421 discusses the ghost image phenomenon and proposes a method to solve the problem, but does not provide any solution for the ghost image phenomenon generated by different eye interval and viewing positions. Hereinafter, the causes of the two phenomena are first explained and a solution is provided.

FIG. 4 shows a viewable range $L_S$ of the views $V_0, V_1, V_2, V_3$ on the optimum viewing distance. The generation of the viewable range is described in ROC Patent No. 097135421. On the optimum viewing distance $Z_0$, the viewable range of a single view $V_0$~$V_3$ is in a relation of $L_S=2L_V$. Thus, the viewable range of a single view $V_0$~$V_3$ is overlapped with the viewable ranges of two neighboring views, which is a root cause of the ghost image. That is to say, in a horizontal direction, when the eye interval of the viewer is different from the distance $L_V$ of the best viewing points, or the viewing positions of the two eyes are not located at the best viewing points, the ghost images are generated. Hereinafter, such ghost image is referred to as a transverse ghost image.

FIG. 5 shows a ghost image phenomenon generated when the eye interval $L_E \neq L_V$. Provided that the left eye 120 is located at the best viewing point $P_2$, since the eye interval $L_E \neq L_V$, the right eye 121 is deviated from the best viewing point $P_1$. Thus, the right eye 121 may observe the views $V_1$ and $V_2$ (when $L_E < L_V$) at the same time or observe the views $V_1$ and $V_0$ (when $L_E > L_V$, not shown) at the same time.

FIG. 6 shows a ghost image phenomenon generated by the wrong viewing position. Even if the eye interval $L_E = L_V$, due to the wrong viewing position, the left eye 120 observes the views $V_1$ and $V_2$ at the same time, and the right eye 121 observes the views $V_0$ and $V_1$ at the same time.

SUMMARY OF THE INVENTION

The present invention provides a parallax barrier 3D image display method, and more particularly a vertical strip parallax barrier design method to avoid transverse ghost images generated by a conventional parallax barrier and directed to arrangement of sub-pixels on a screen of a flat panel display, which displays multi-view 3D images with minimal ghost images, thereby achieving the purpose of optimum 3D image display.

BRIEF DESCRIPTION OF THE DRAWINGS

The present invention will become more fully understood from the detailed description given herein below for illustration only, and thus are not limitative of the present invention, and wherein:

FIG. 20 shows simulation calculation results of R', $\Delta x'_e$, $\Delta x'_{BM}$, $\Delta x'_G$ through C/P and n according to the second embodiment of the present invention;

DETAILED DESCRIPTION OF THE INVENTION

Figure 1:
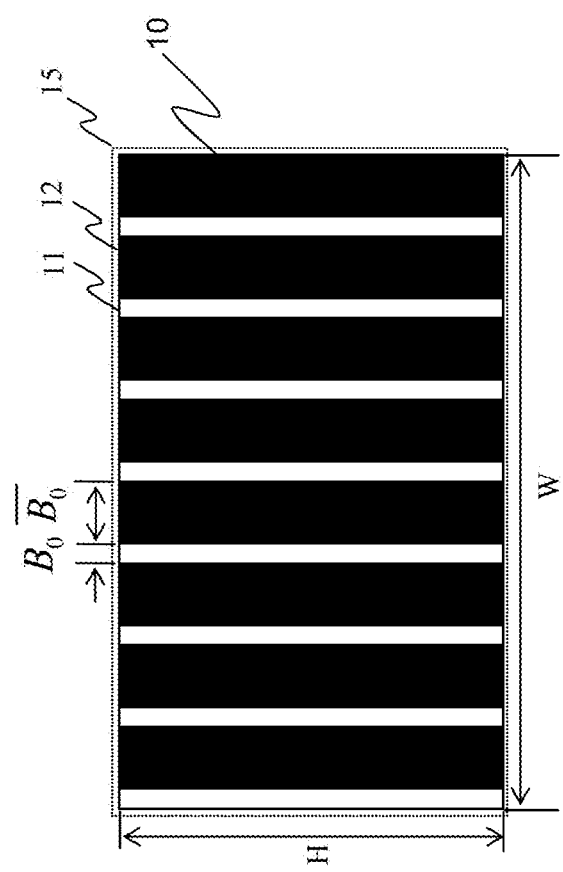
FIG. 1 is a schematic view of a conventional vertical strip parallax barrier.
Figure 2:
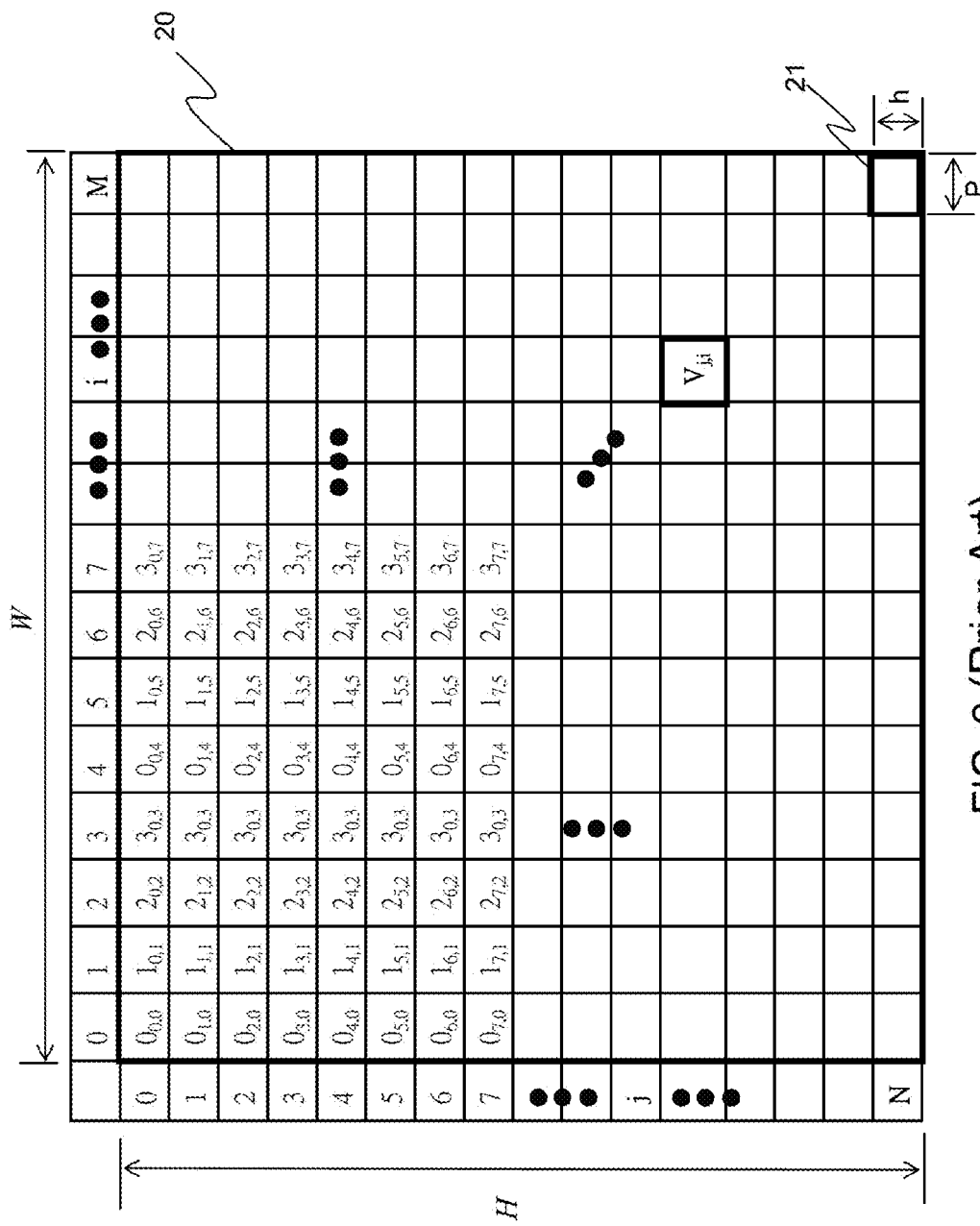
FIG. 2 is a schematic view of the conventional multi-view 3D image corresponding to the vertical strip parallax barrier.
Figure 3:
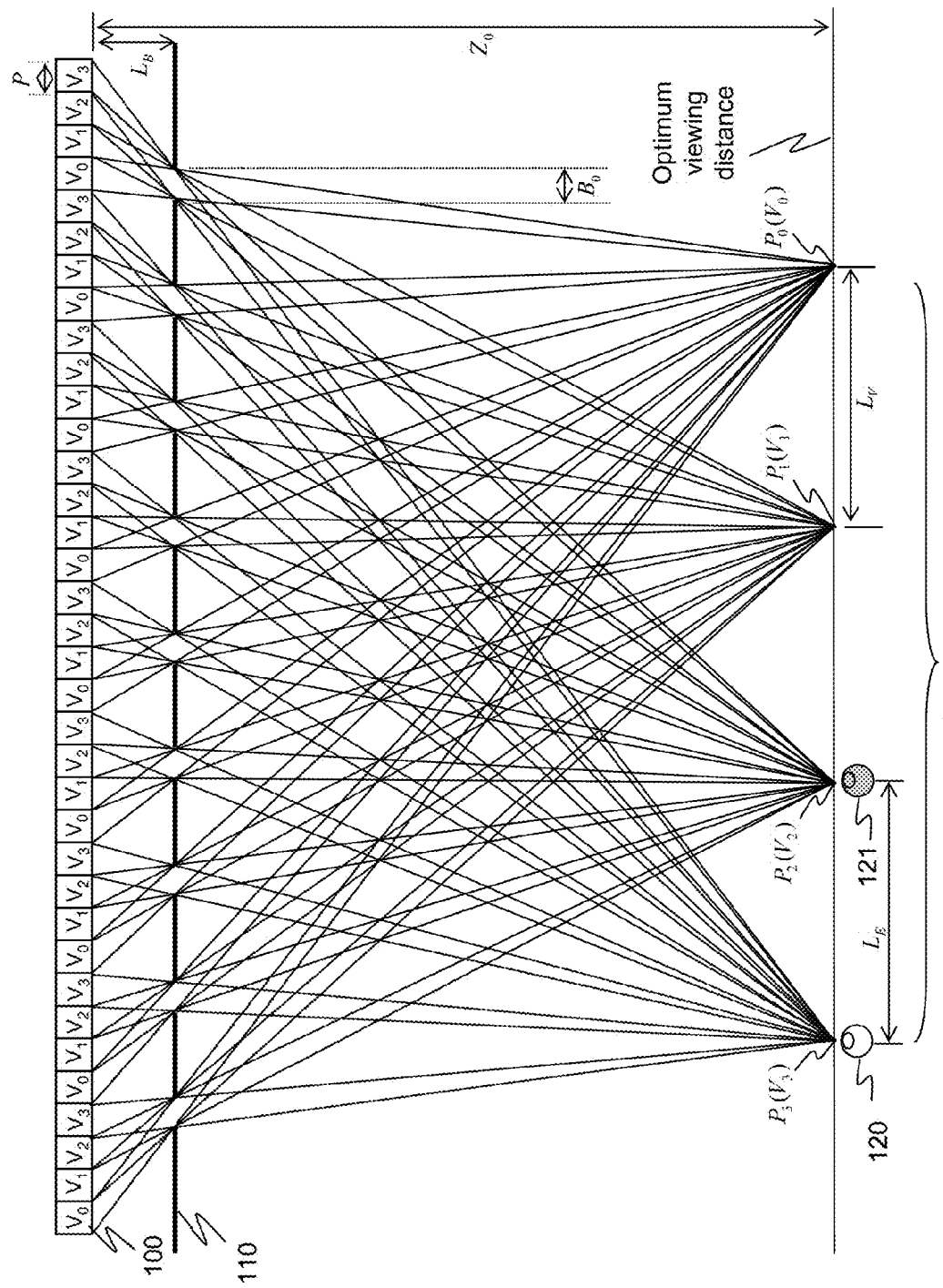
FIG. 3 is a schematic view of the display principle of a conventional 4-view parallax barrier 3D image display.
Figure 4:
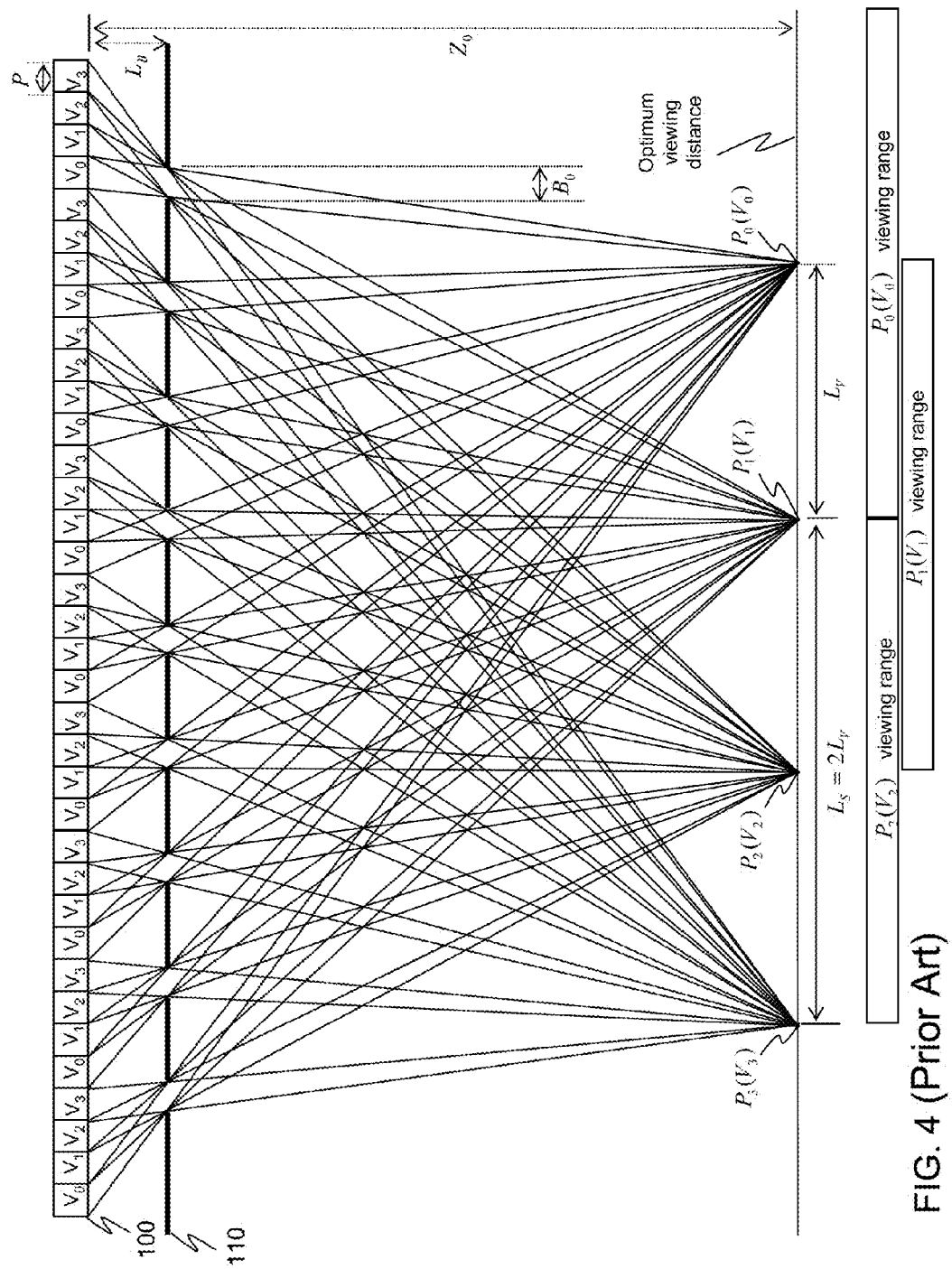
FIG. 4 is a schematic view of the definition of a viewable range of views on the optimum viewing distance.
Figure 5:
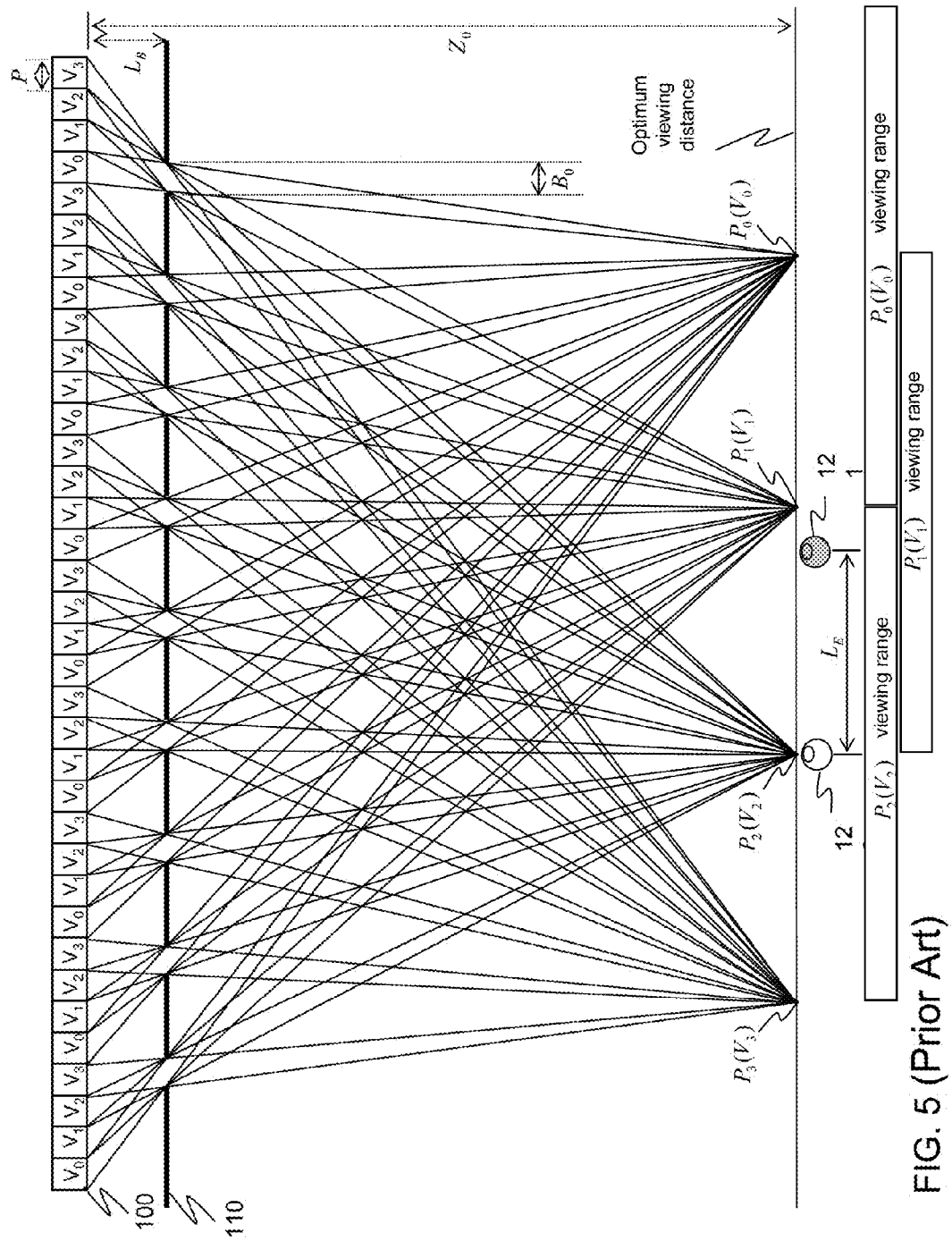
FIG. 5 is a schematic view of a ghost image phenomenon generated when the eye interval $L_E \neq L_V$.
Figure 6:
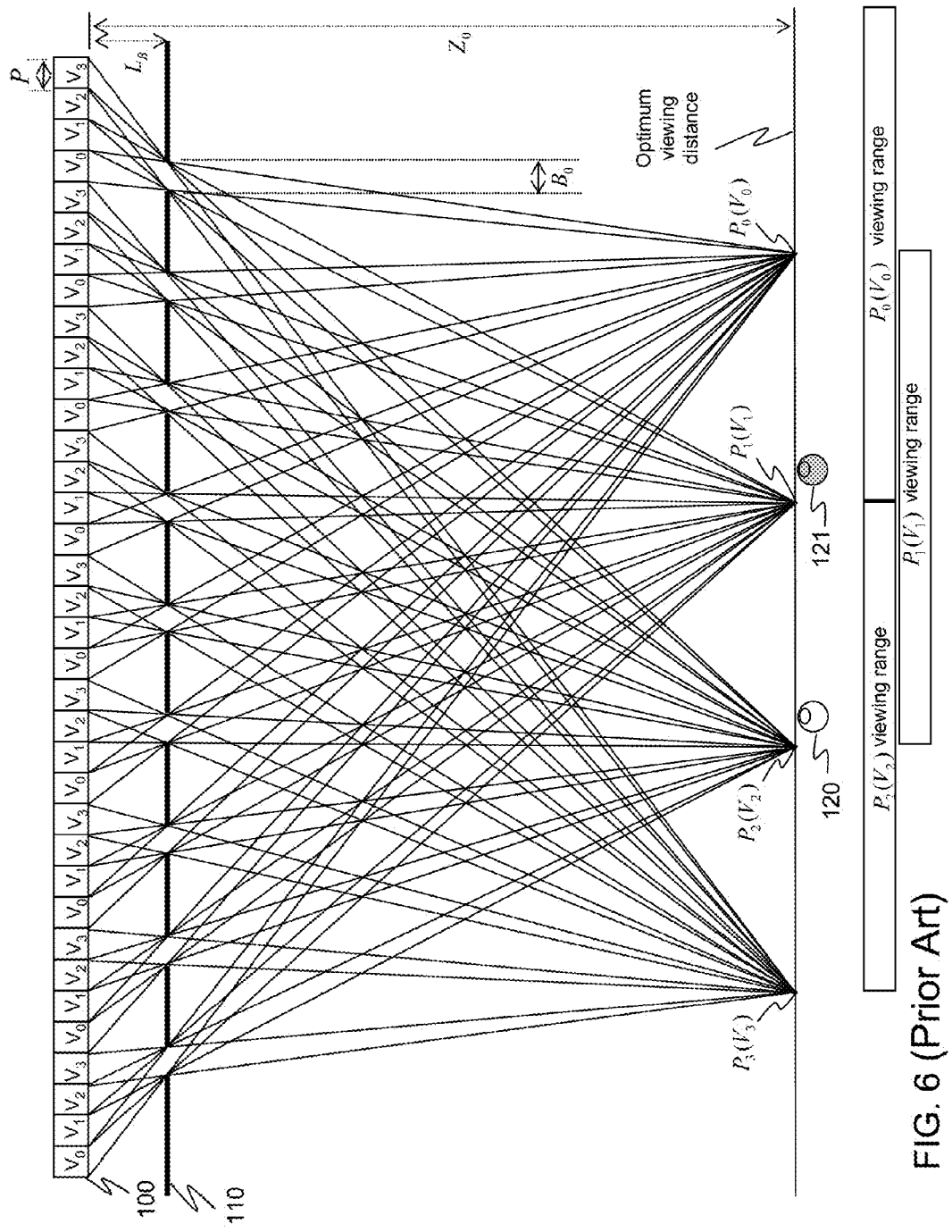
FIG. 6 is a schematic view of a ghost image phenomenon generated by the wrong viewing position.
Figure 7:
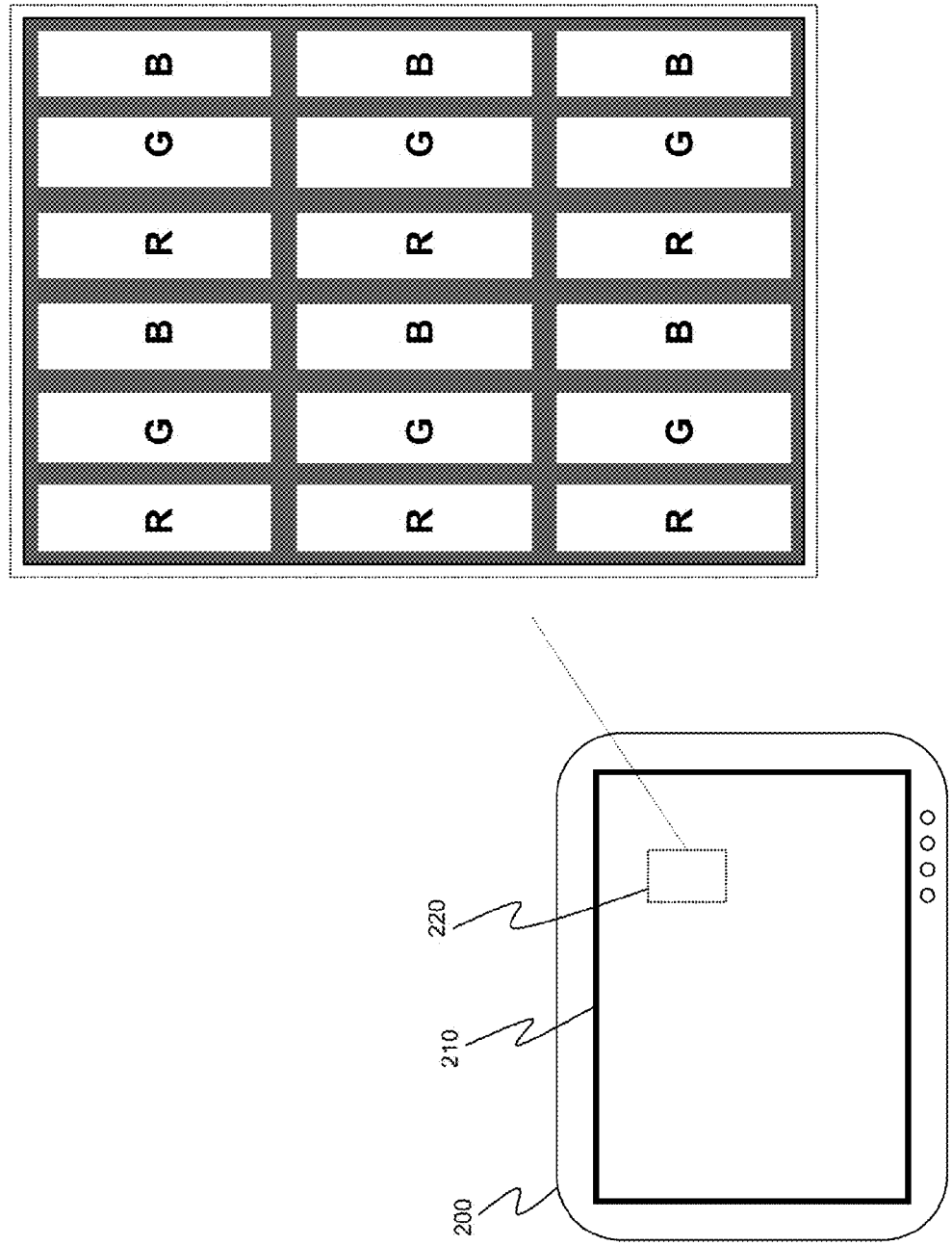
FIG. 7 is a schematic view of sub-pixels on a display screen in strip arrangement.
Figure 8:
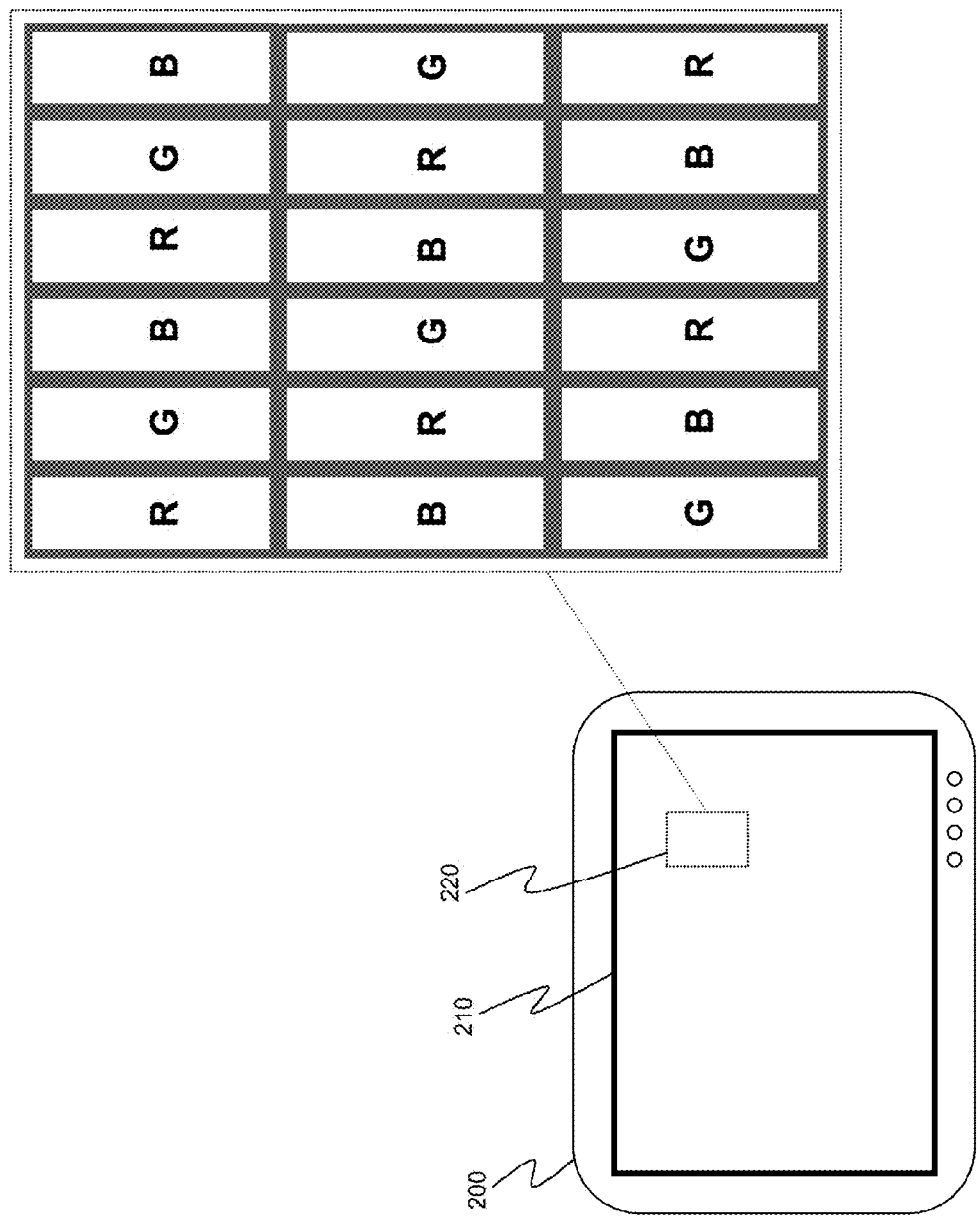
FIG. 8 is a schematic view of sub-pixels on a display screen in Mosaic arrangement.
Figure 9:
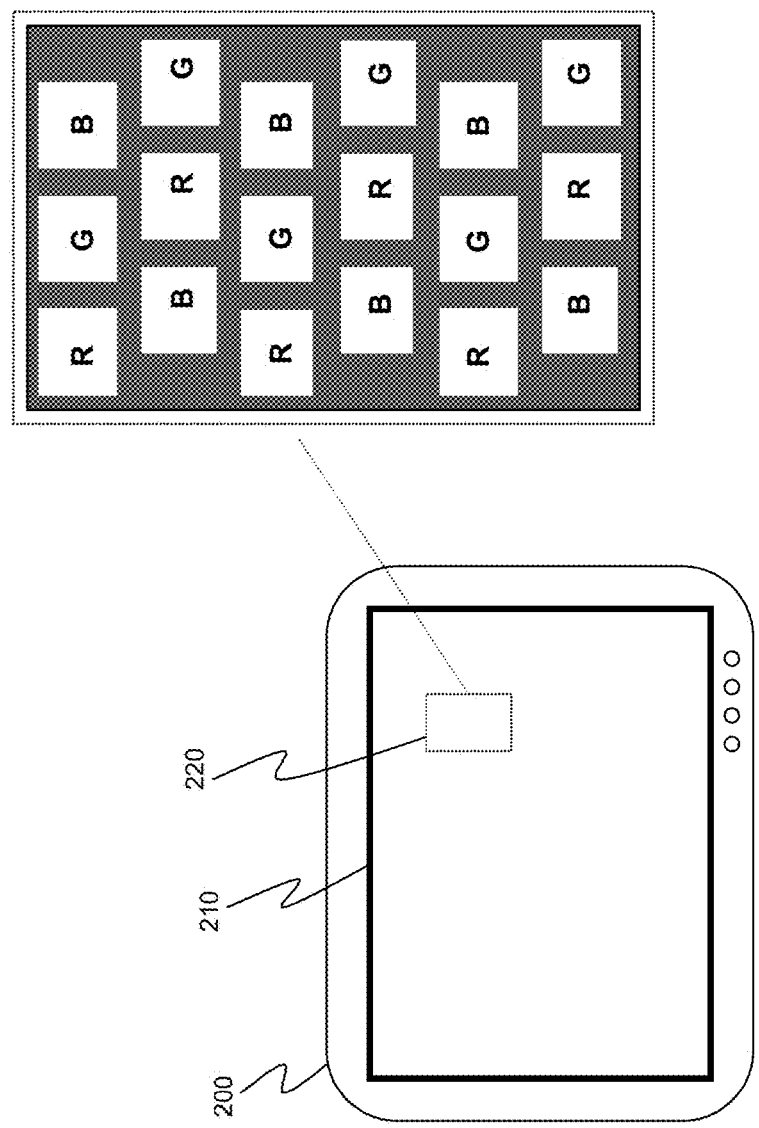
FIG. 9 is a schematic view of sub-pixels on a display screen in triangle arrangement.

FIGS. 7 to 9 are schematic views of the arrangement of sub-pixels on an ordinary screen of a flat panel display. FIG. 7 is a schematic view of sub-pixels in strip arrangement. FIG. 8 is a schematic view of sub-pixels in Mosaic arrangement. FIG. 9 is a schematic view of sub-pixels in triangle arrangement. The above three arrangement manners are common structures of a sub-pixel arrangement 220 on a screen 210 of a conventional flat panel display 200, and the details will not be described herein.

Figure 10:
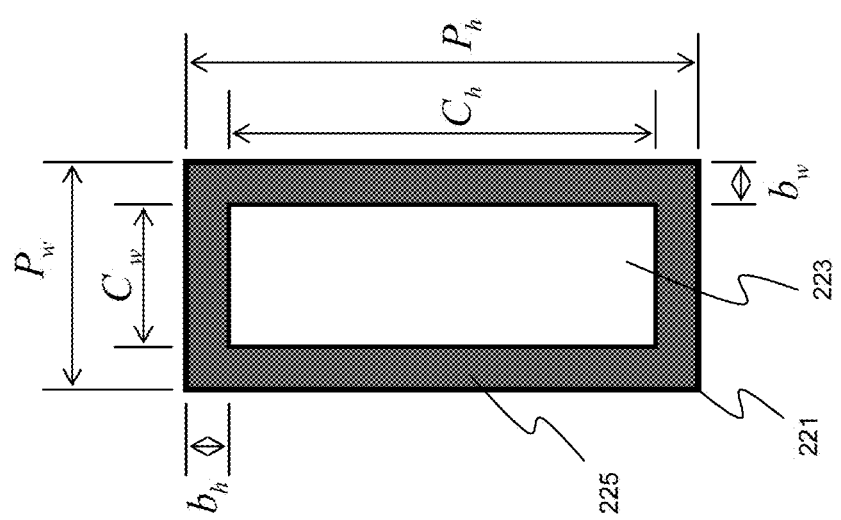
FIG. 10 is a schematic view of a single sub-pixel structure.

Any structure of arrangement, as shown in FIG. 10, has the same single sub-pixel structure 221, and the single sub-pixel structure 221 is mainly formed of a color filter 223 and a black matrix 225. The size of the sub-pixel structure 221 is $P_w \times P_h$, in which $P_w$ is a horizontal width of the sub-pixels and $P_h$ is a vertical width of the sub-pixels. The size of the color filter 223 is $C_w \times C_h$, in which $C_w$ is a horizontal width of the color filter and $C_h$ is a vertical width of the color filter. The half widths of the black matrix 225 in horizontal and vertical directions are $b_w$, $b_h$ with the following relations.

$$b_w = (P_w - C_w)/2 \quad (3)$$

$$b_h = (P_h - C_h)/2 \quad (4)$$

For the convenience of showing and illustrating the alleviation of transverse ghost image phenomenon of the conventional parallax barrier, the 2-view parallax barrier is taken as an example for illustration below.

Figure 11:
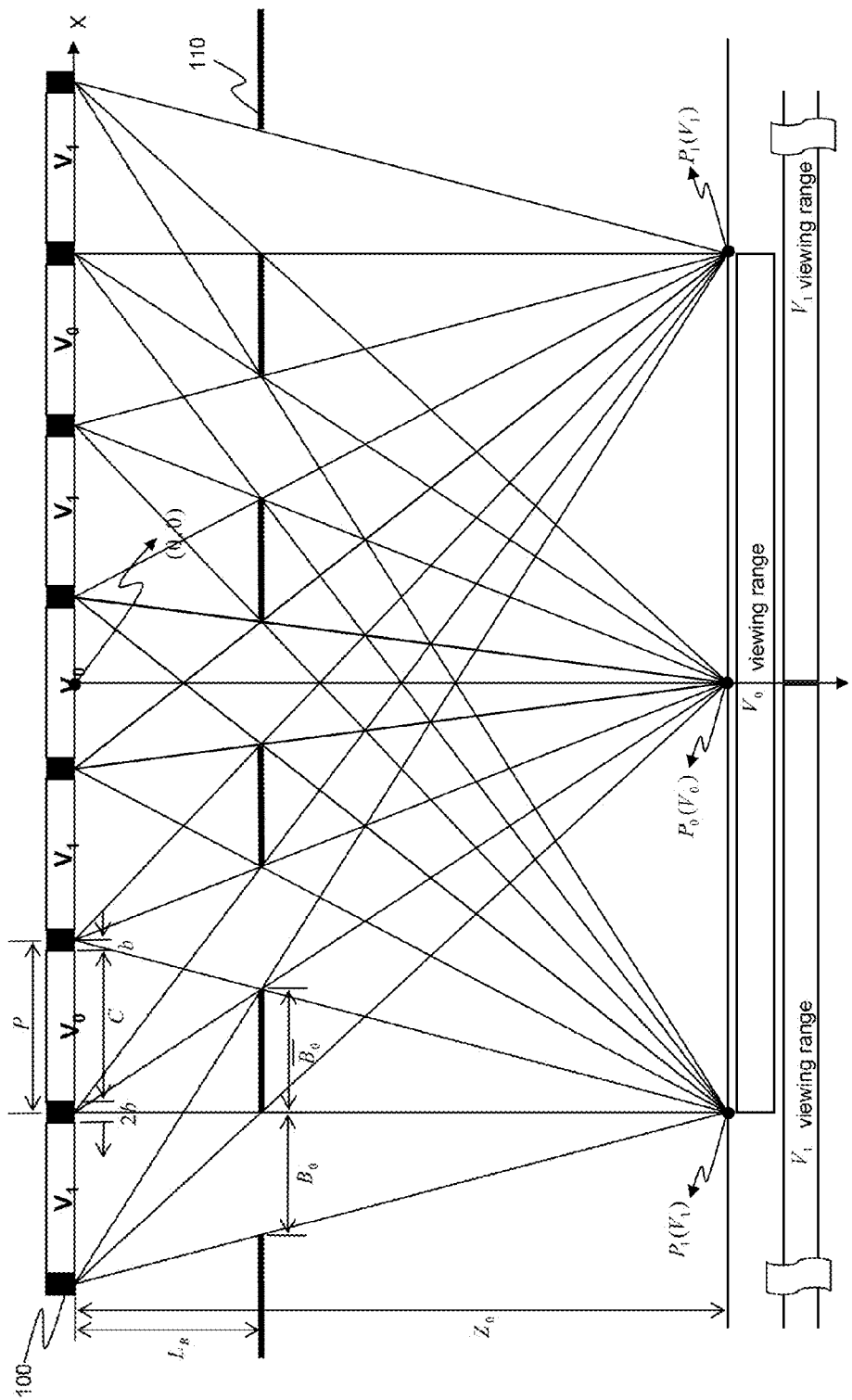
FIG. 11 is a schematic view of a conventional 2-view parallax barrier design and 2-view 3D image display.

FIG. 11 is a schematic view of the conventional 2-view parallax barrier design and 2-view 3D image display. The 2-view images $V_0$, $V_1$ are sequentially displayed on the display screen 100 in unit of sub-pixels. Through the function of the 2-view parallax barrier 110, the 2-view image $V_0$, $V_1$ can be individually observed at two best viewing points $P_0$, $P_1$ on the optimum viewing distance $Z_0$ (Let the distance between the best viewing points be $L_v$, and $L_v = L_E$). Based on the above displaying condition, the width of the opening of the 2-view parallax barrier 110 and the installation distance of the parallax barrier need the following design. For ease of illustration, in the following calculation, coordinates (X, Z) are set, a display plane of the display screen 100 is installed vertically to a Z-axis, an origin of coordinates is set in the center of the sub-pixels of $V_0$, and the Z-axis passes through the best viewing point $P_0$.

Firstly, it is set that the width of the sub-pixels on the display screen 100 is P (P may be $P_w$ or $P_h$), the width of the color filter is C (when $P=P_w$, $C=C_w$ or when $P=P_h$, $C=C_h$), and the width of the black matrix is 2b (when $P=P_w$, $b=b_w$ or when $P=P_h$, $b=b_h$). Additionally, it is set that the width of the opening of the 2-view parallax barrier 110 is $B_0$, the shielding width is $\overline{B_0}$, and the optimum viewing distance is $Z_0$. Therefore, according to Formulae (1) and (2), design parameters $B_0$ and $L_B$ of the parallax barrier are calculated as follows:

$$B_0 = \frac{L_V}{P+L_V}P \qquad (5)$$

$$L_B = \frac{P-B_0}{P}Z_0 \qquad (6)$$

Further, another design parameter necessary to the parallax barrier, i.e., the shielding width $\overline{B_0}$ of the parallax barrier 110, is calculated by the following formula:

$$\overline{B_0} = (N-1)B_0 \qquad (7)$$

where N is a total view number of a multi-views image, and herein N=2.

The conventional parallax barrier design method is described above and is applicable to the multi-view 3D image display in which the total view number N≧2 (i.e., the multi-view 3D image of the present invention has a total view number N≧2). The parallax barrier designed according to Formulae (5) to (7) usually has relations of $L_V=L_E$ and $L_S=2L_V$. Further, the parallax barrier has optical characteristics of the horizontally separated multi-view 3D image. Therefore, the above design method is also applicable to the design of a slant parallax barrier and a slant and step parallax barrier in the horizontal direction. As described above, the parallax barrier designed according to the above method may easily generate the transverse ghost image. To avoid the problem, the present invention provides a design method, which can eliminate the ghost image caused by different eye interval of viewers or viewing positions of the two eyes being not at the best viewing points.

First Embodiment

Figure 12:
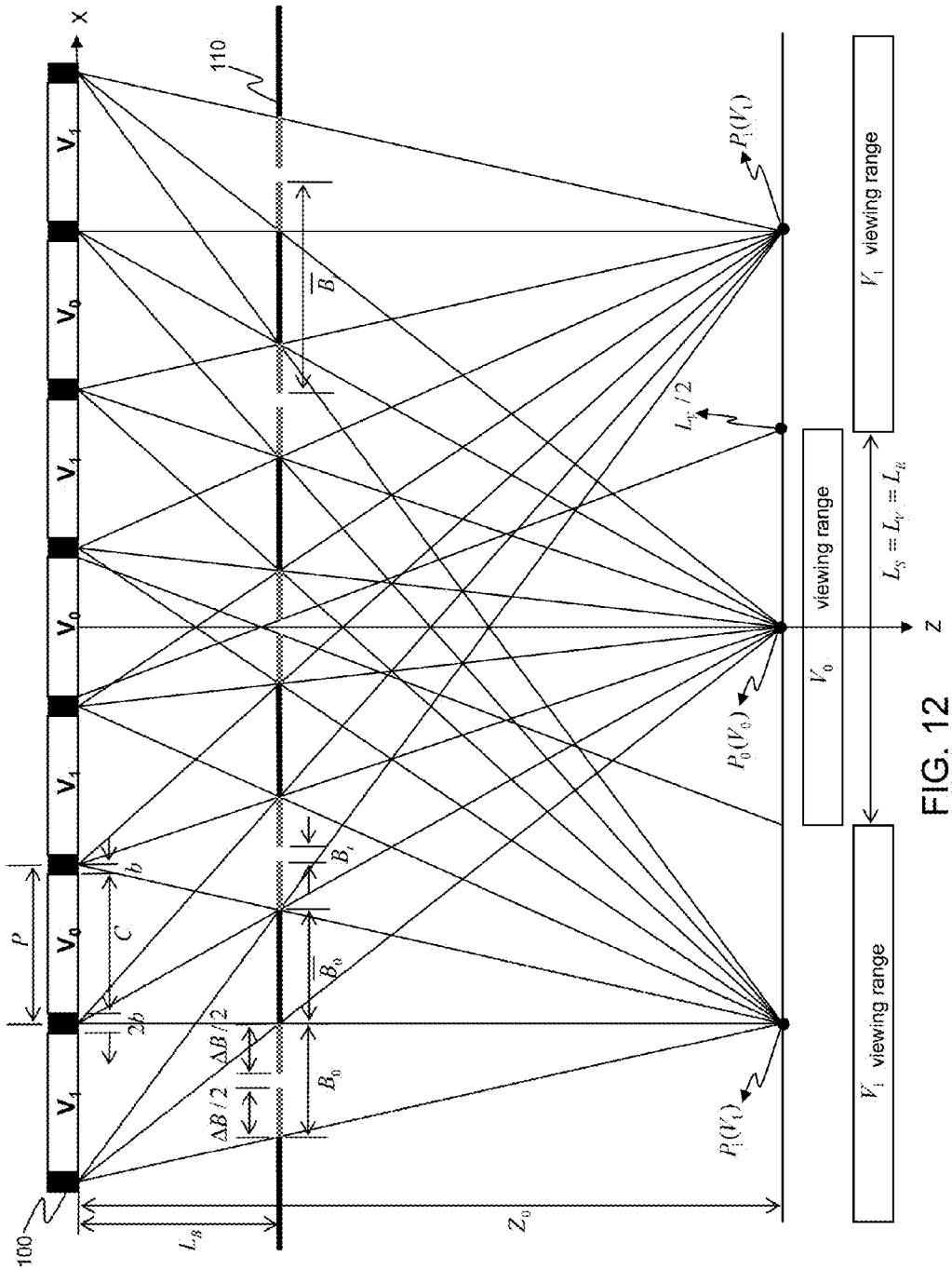
FIG. 12 is a schematic view of the construction of a first embodiment of the present invention.

FIG. 12 is a schematic view of the construction of a first embodiment of the present invention. The parallax barrier is designed based on the condition that the viewable ranges of the neighboring views are not overlapped. To solve the above problem, the design method of the present invention, as shown in FIG. 12, basically appropriately reduces the width $B_0$ of the opening of the parallax barrier 110 to $B_t$ (let is ΔB be the reduced quantity), such that the viewable ranges of neighboring views are not overlapped when the viewing range $L_S$ of each view on the optimum viewing distance $Z_0$ is reduced to a half, i.e., $L_S=L_V=L_E$. Thus, the transverse ghost image phenomenon generated by different eye interval or viewing positions of the two eyes being not at the best viewing points can be effectively solved. ΔB is calculated by the following formula:

$$\frac{\Delta B}{B_0} = \frac{C}{P} \qquad (8)$$

Hence, according to the definition $B_t=B_0-\Delta B$ and Formula (8), the width $B_t$ of the opening of the parallax barrier is:

$$B_t = \left(1 - \frac{C}{P}\right)B_0 \qquad (9)$$

Further, according to the definition $\overline{B_t}=\overline{B_0}+\Delta B$ and Formulae (7) and (8), the shielding width $\overline{B_t}$ of the parallax barrier is:

$$\overline{B_t} = \left[N - \left(1 - \frac{C}{P}\right)\right]B_0 \qquad (10)$$

Figure 13:
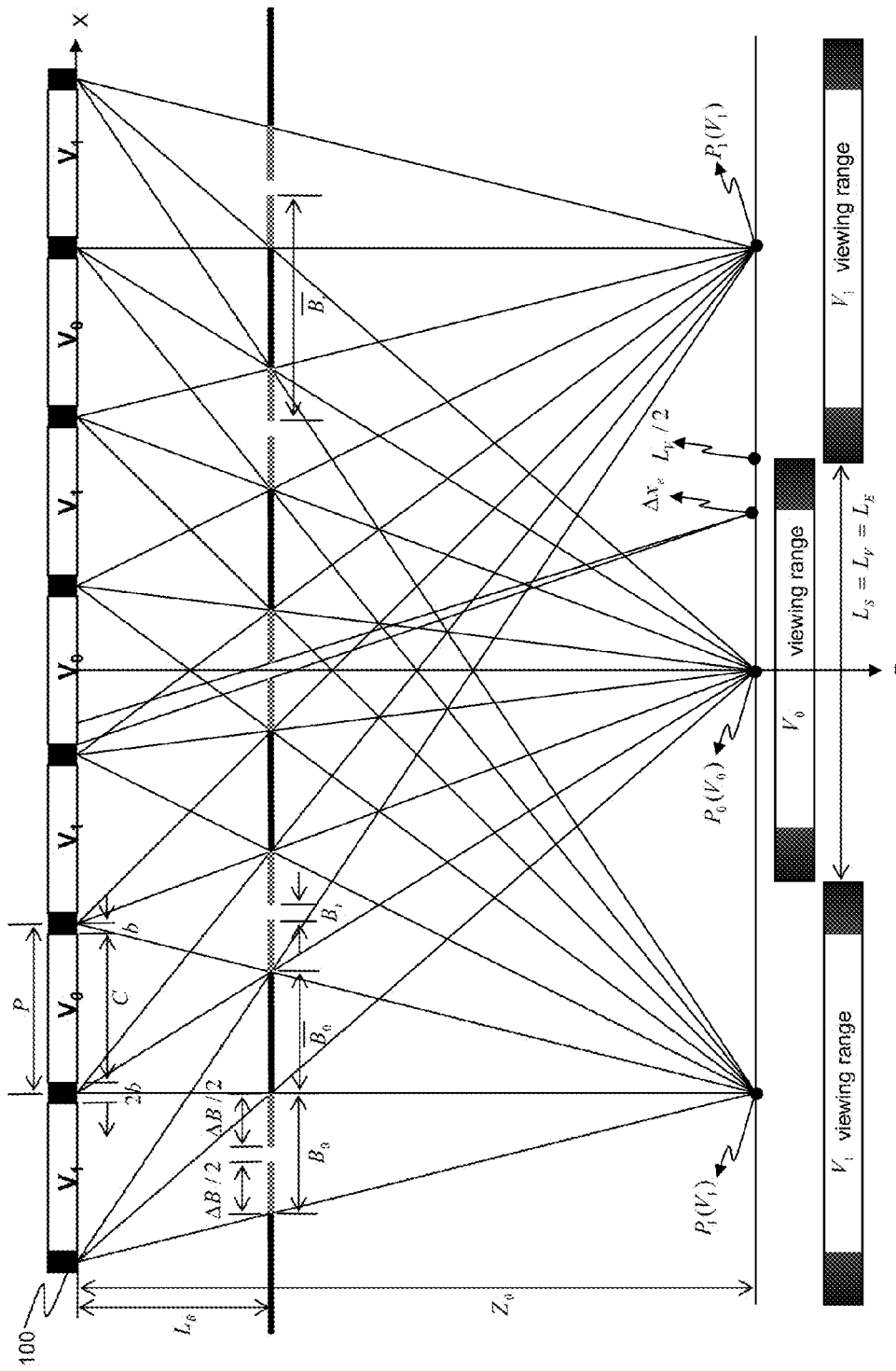
FIG. 13 is a schematic view of the definition of a maximum viewing range without ghost image according to the first embodiment of the present invention.

After $B_t$ is obtained, a maximum viewing range $\Delta x_e$ without ghost image can be calculated. Referring to FIG. 13, $\Delta x_e$ is defined as a limit position of the view image $V_0$ that can be completely observed under the condition that the black matrix cannot be seen when the viewing position is deviated from the best viewing point $P_0$ (e.g., to the right). $\Delta x_e$ is calculated by the following formula:

$$\Delta x_e = \left(\frac{C}{P} - \frac{1}{2}\right)L_V \qquad (11)$$

Generally, an average spacing of two eyes of human beings is 65 mm to 70 mm, and due to individual differences, approximately a 5-mm distribution deviation exists. Thus, as long as the maximum viewing range $\Delta x_e$ without ghost image exceeds the distribution deviation of eye interval (i.e., 5 mm), the problem of transverse ghost image caused by the difference of eye interval can be eliminated. According to Formula (11), when C/P=0.8, $\Delta x_e=0.3L_V$, i.e., $x_e=21$ mm (as $L_V=L_E=70$ mm). Therefore, the problem of transverse ghost image caused by the difference of eye interval can be completely solved, and the two eyes are allowed to view the 3D image without ghost image at a position deviated from the best viewing point.

Figure 14:
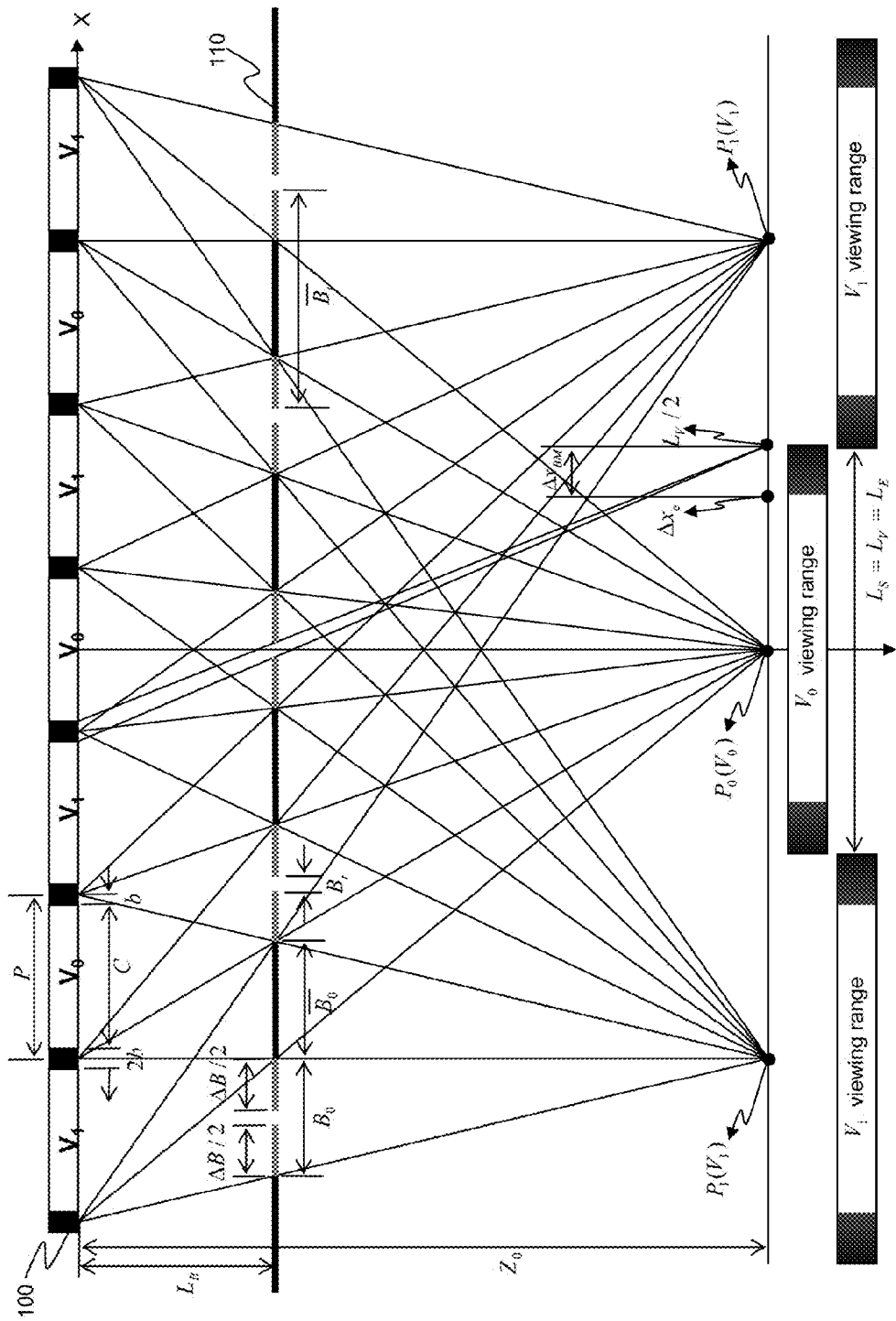
FIG. 14 is a schematic view of the definition of a brightness attenuation zone according to the first embodiment of the present invention.

When the viewing position exceeds $\Delta x_e$, as shown in FIG. 14, i.e., enters a brightness attenuation zone, the view image $V_0$ and the black matrix are observed at the same time. Thus, with the viewing position shifting to right, the view image $V_0$ gradually becomes dark. Finally, when the viewing position reaches $L_V/2$, the view image $V_0$ cannot be observed, and a completely dark image is presented. Thus, a width of the brightness attenuation zone is $\Delta x_{BM}$. $\Delta x_{BM}$ is calculated by the following formula:

$$\Delta x_{BM} = L_V - \Delta x_e \qquad (12)$$

Substitute Formula (11) into Formula (12), and the following formula is obtained:

$$\Delta x_{BM} = \left(\frac{3}{2} - \frac{C}{P}\right)L_V \qquad (13)$$

Additionally, when the viewing positions of the two eyes are in the brightness attenuation zone, the ghost image does not exist. However, the brightness of the view image becomes dark.

Figure 15:
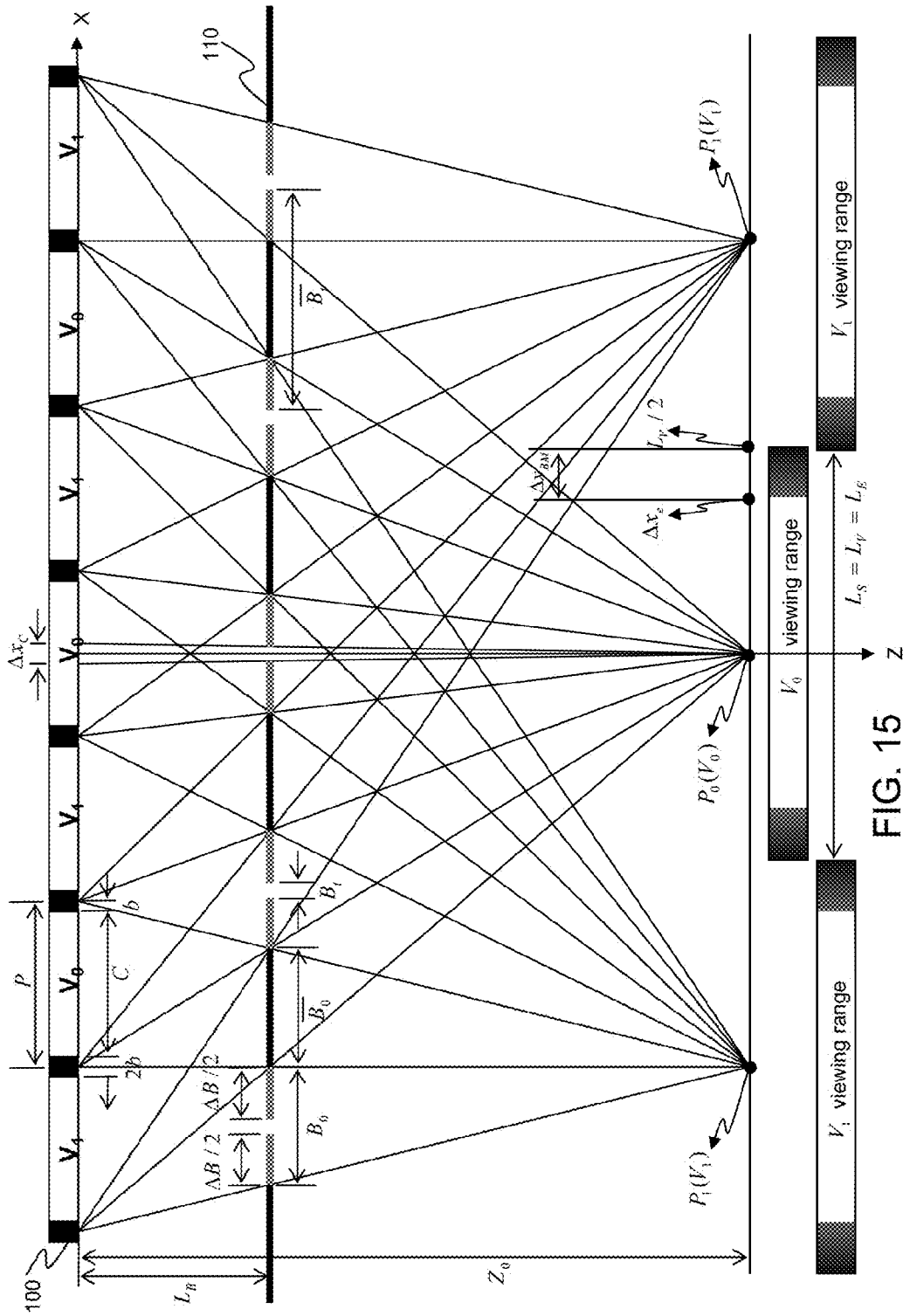
FIG. 15 is a schematic view of the definition of an emitting light length according to the first embodiment of the present invention.

Although the increase of C/P may raise $\Delta x_e$, according to Formula (9), the width $B_t$ of the opening of the parallax barrier is reduced, which decreases the brightness of the view image $V_0$. Referring to FIG. 15, a physical quantity $\Delta x_C$ is defined. $\Delta x_C$ is an actual length of light emitting to eyes through the opening of the parallax barrier for the view image $V_0$ ($\Delta x_C$ is referred to as emitting light length for short hereinafter), and the amount of $\Delta x_C$ is calculated by:

$$\Delta x_C = P - C = 2b \qquad (14)$$

Further, a brightness ratio R is defined to show the brightness variation after the opening of the parallax barrier is reduced:

$$R = \frac{\Delta x_C}{C} \quad (15)$$

where, as shown in FIG. 11, C is an actual emitting light length of eyes when the width of the opening of the parallax barrier is $B_0$ before the opening of the parallax barrier is reduced. Additionally, according to Formula (14), after the opening of the parallax barrier is reduced, the brightness ratio is:

$$R = \frac{1}{C/P} - 1 \quad (16)$$

thus, the larger the C/P value is, the lower the brightness will be. When C/P=0.8, R=¼, i.e., the brightness is lowered to a quarter.

Figure 16:
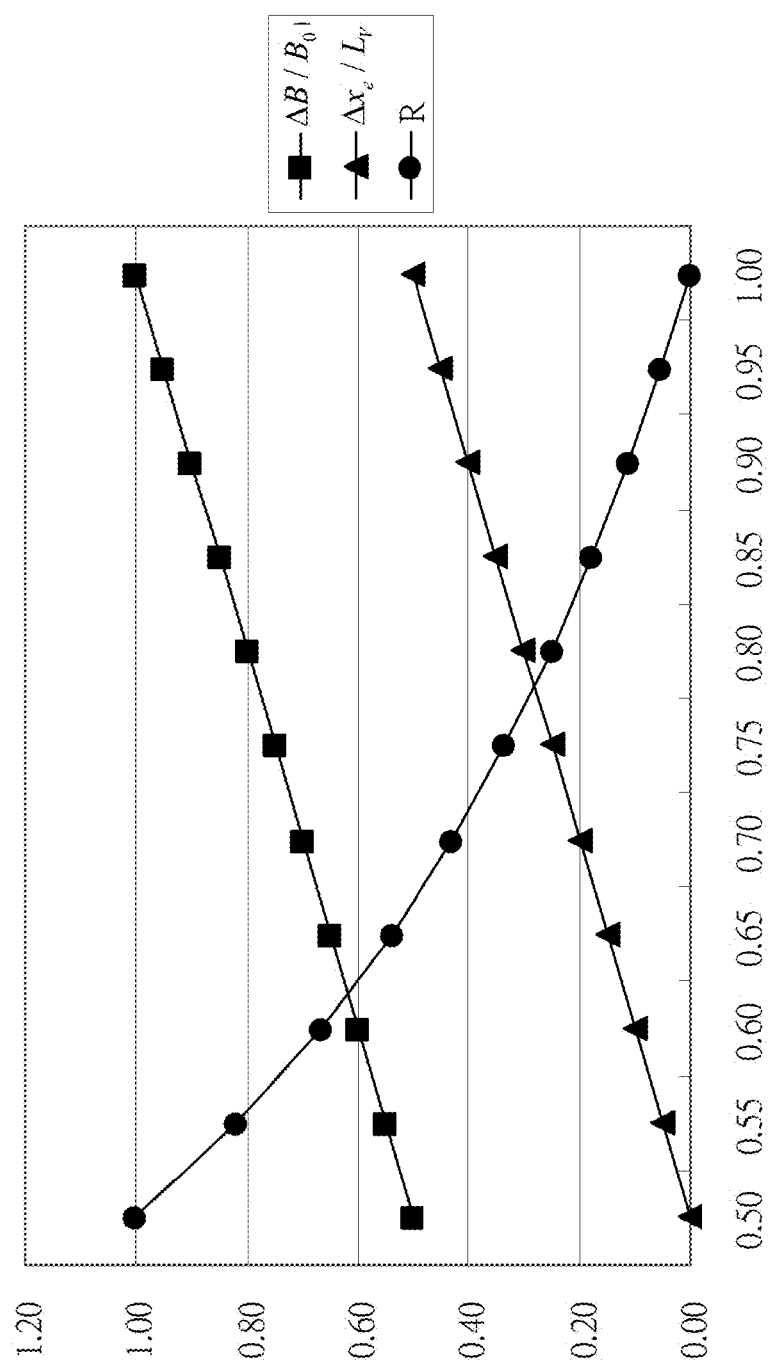
FIG. 16 is a schematic view of optical characteristics of a parallax barrier designed according to the first embodiment of the present invention.

In view of the above, the parallax barrier is designed under the condition that $L_S = L_V = L_E$, i.e., the viewable ranges of neighboring views are not overlapped, and the characteristics thereof are shown in FIG. 16.

FIG. 16 is a diagram of C/P according to Formulae (8), (11), and (16) to illustrate relations of the design parameters $\Delta B/B_0$, $\Delta x_e/L_V$, and R of the parallax barrier with the structure parameter C/P of the sub-pixels on the display screen. $\Delta B/B_0$ is proportional to C/P, i.e., the larger the C/P is, the smaller the opening of the parallax barrier will be. Further, $\Delta x_e/L_V$ is also proportional to C/P, and R is approximately in inverse proportion to C/P. Thus, although the increase of C/P may obtain a larger $\Delta x_e/L_V$, i.e., the maximum viewing range without ghost image is expanded, the brightness ratio of the view is greatly reduced at the same time. Additionally, although the smaller the C/P is, the greater the brightness ratio will be, $\Delta x_e/L_V$ is inversely reduced, i.e., the dark image is easily observed.

Due to the improvement of the current display manufacturing technology (such as TFT LCD panel), the C/P value may be greater than 0.8, and according to the above calculations, the parallax barrier designed by the method of the present invention may present a view image with a brightness reduced to a quarter of the original maximum brightness. Definitely, the brightness of the light source of the display may be increased to solve this defect. However, the increase of the brightness of the display light source may raise the manufacturing cost and power consumption, which is not an effective solution in terms of economy. Therefore, an improved design method is provided to solve the problem of brightness decrease.

Second Embodiment

Compared with the design in which the viewable ranges of neighboring views are not overlapped (the design condition is $L_S = L_V = L_E$), according to the condition of $L_V = L_E$, the design method of the present invention appropriately enlarges the original width $B_t$ of the opening of the parallax barrier to $B'_t$, so as to increase the view brightness. The steps of design are illustrated as follows.

Figure 17:
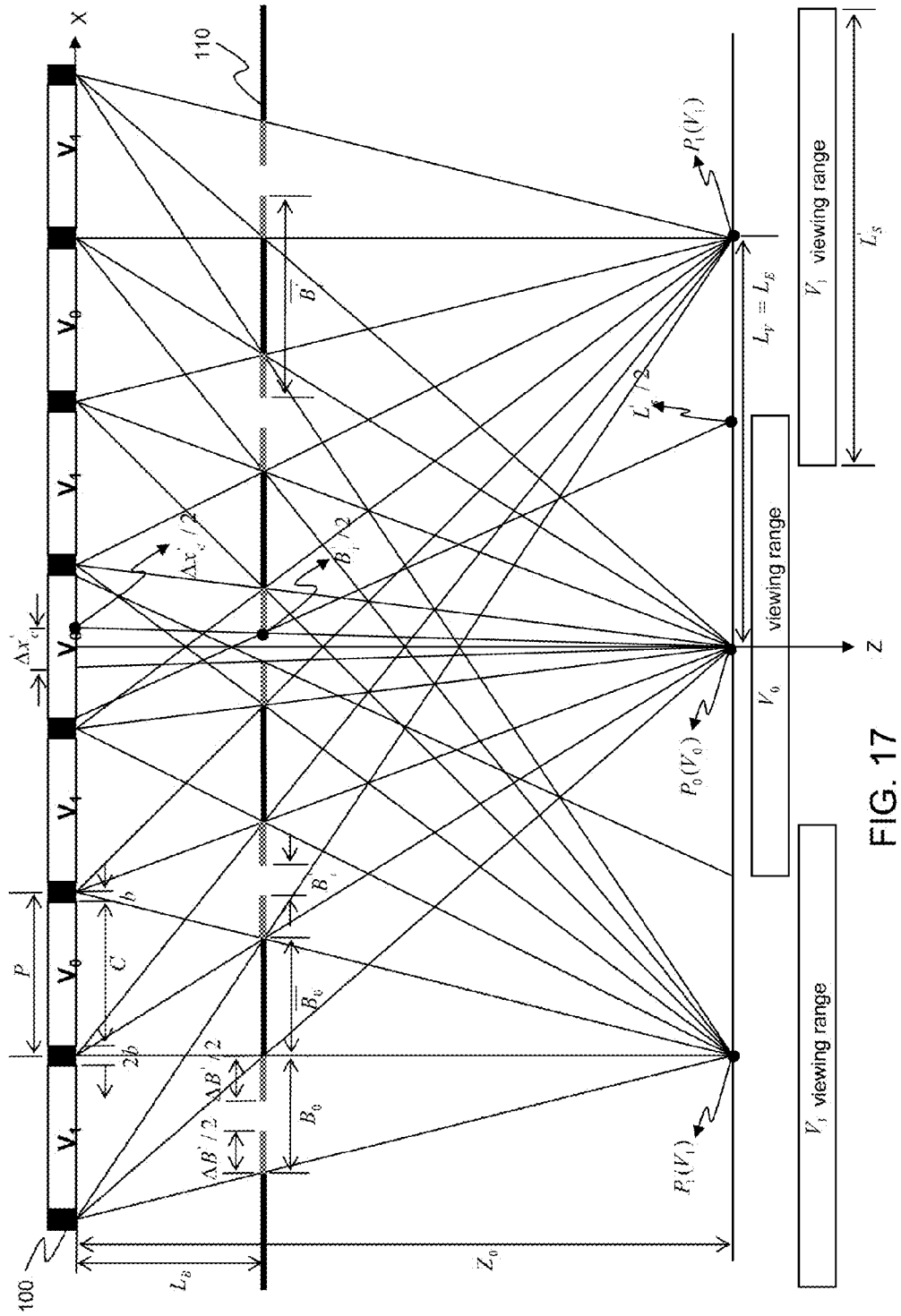
FIG. 17 is a schematic view of the construction of a second embodiment of the present invention.

As described above, for the view image $V_0$, the actual emitting light brightness of eyes is proportional to the emitting light length $\Delta x'_C$ (i.e., the length of sub-pixels observed through the opening of the parallax barrier). Therefore, the expanding of the width of the opening of the parallax barrier can increase the emitting light length. Referring to FIG. 17, the emitting light length is first enlarged to $\Delta x'_C$ which satisfies the following relation:

$$\Delta x'_C = n\Delta x_C = 2nb \quad (17)$$

where n is defined as an opening enlarging factor, is a positive real number satisfying $n \geq 1$, and meets the following relation:

$$n \leq \frac{C}{2b} \quad (18)$$

That is, the width of the opening of the parallax barrier can be enlarged to C at most. Thus, after the enlarging of the width of the opening of the parallax barrier, the brightness ratio R' becomes:

$$R' = \frac{2nb}{C} \quad (19)$$

According to $\Delta x'_C$, the width $B'_t$ of the opening of the parallax barrier is obtained, as expressed the following formula:

$$B'_t = n\left(1 - \frac{C}{P}\right)B_0 \quad (20)$$

Thus, according to the definition $\overline{B'_t} = B_0 + \overline{B_0} - B'_t$ and Formula (20), $\overline{B'_t}$ is obtained as follows:

$$\overline{B'_t} = \left[N - n\left(1 - \frac{C}{P}\right)\right]B_0 \quad (21)$$

After $B'_t$ is obtained, the viewable range $L'_S$ of view is calculated through the following formula:

$$\frac{L'_S}{2} = \frac{C + \Delta x'_c}{P} \cdot \frac{L_V}{2} \quad (22)$$

Figure 18:
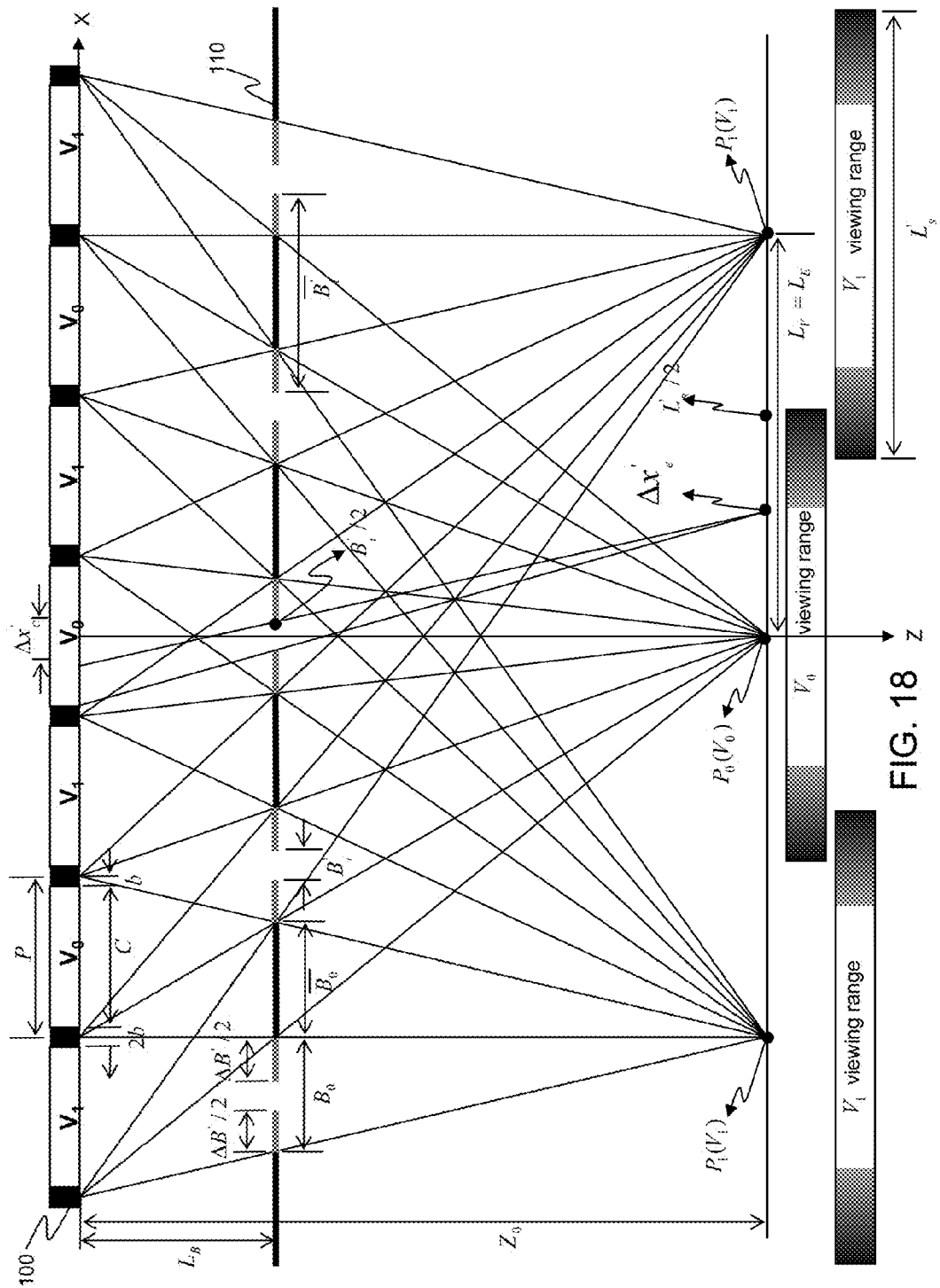
FIG. 18 is a schematic view of the definition of a maximum viewing range without ghost image according to the second embodiment of the present invention.

Additionally, referring to FIG. 18, the maximum viewing range $\Delta x'_e$ without ghost image can be calculated, as expressed in the following formula:

$$\Delta x'_e = \frac{C - \Delta x'_c}{P} \cdot \frac{L_V}{2} \quad (23)$$

Figure 19:
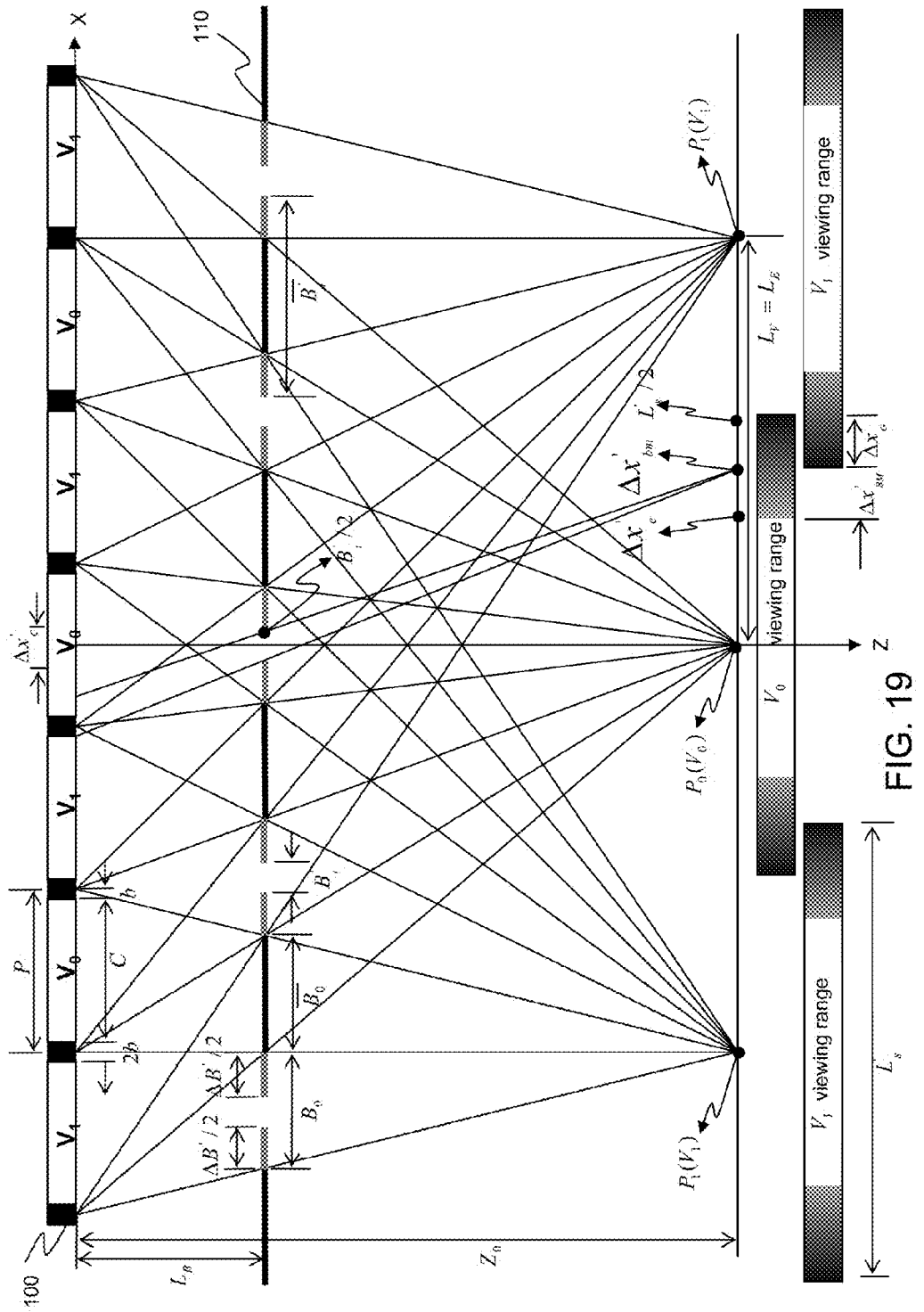
FIG. 19 is a schematic view of the definition of a brightness attenuation zone and a ghost image zone according to the second embodiment of the present invention.

Further, referring to FIG. 19, when shifting to right from $\Delta x'_e$, the viewing position enters the brightness attenuation zone, and the right end position $\Delta x'_{bm}$ of the brightness attenuation zone may be calculated through the following formula:

$$\Delta x'_{bm} = \frac{C - \Delta x'_c}{P} \cdot \frac{L_V}{2} + \frac{2b}{P} L_V \quad (24)$$

Then, subtract Formula (23) from Formula (23) to obtain a width of the brightness attenuation zone $\Delta x'_{BM}$, as expressed in the following formula:

$$\Delta x'_{BM} = \frac{2b}{P} L_V = \left(1 - \frac{C}{P}\right) L_V \qquad (25)$$

Finally, when shifting to right from $\Delta x'_{bm}$ again, the viewing position enters a ghost image zone, and the right end position of the ghost image zone is $L'_S/2$. Then, subtract Formula (24) from Formula (22) to obtain a width of the ghost image zone $\Delta x'_G$, as expressed in the following formula:

$$\Delta x'_G = (n-1) \frac{2b}{P} L_V \qquad (26)$$

Substitute Formula (25) into Formula (26), and a relation of $\Delta x'_G$ and $\Delta x'_{BM}$ is obtained as follows:

$$\Delta x'_G = (n-1) \Delta x'_{BM} \qquad (27)$$

In view of the above, in order to reduce the transverse ghost image, the parallax barrier design method of the present invention is basically directed to the structure parameter C/P of the sub-pixels on the display screen. Firstly, $B_0$ and $\overline{B_0}$ are obtained according to Formulae (5) and (7). Next, under the condition that the viewable ranges of neighboring views are not overlapped (i.e., $L_S=L_V=L_E$), according to Formula (9), the width of the opening of the parallax barrier is reduced to $B_t$, thereby effectively increasing the maximum viewing range $\Delta x_e$ without ghost image and obtaining the width of the ghost image zone $\Delta x_G=0$. However, for the design of a larger C/P value (for example, the C/P is greater than 0.8), according to Formulae (14) to (16), as the width of the opening of the parallax barrier is reduced, the view brightness is also lowered. Therefore, the present invention further provides a design method for solving the above problem and achieving the maximum viewing range and viewing brightness at the same time.

In the method of the present invention, according to Formulae (17) and (18), the width of the opening of the parallax barrier is appropriately enlarged (i.e., an appropriate value of n is selected). Then, according to Formulae (19), (23), (25), and (27), the brightness ratio R', the maximum viewing range $\Delta x'_e$ without ghost image, the width of the brightness attenuation zone $\Delta x'_{BM}$, and the width of the ghost image zone $\Delta x'_e$ are obtained.

FIG. 20 shows simulation calculation results of R', $\Delta x'_e$, $\Delta x'_{BM}$, and $\Delta x'_G$ through C/P and n. It is a main subject of the design method of the present invention to select an appropriate value of n from values obtained in simulation calculation. Referring to FIG. 20, for any structure parameter C/P of the sub-pixels on the display screen and values of R', $\Delta x'_e$, $\Delta x'_{BM}$, $\Delta x'_G$ through simulation calculation, firstly the maximum viewing range $\Delta x'_e$ without ghost image is larger than the distribution deviation of eye interval $\Delta L_E$ (for example, $\Delta L_E \geq 5$ mm), i.e., $\Delta x'_e$ must satisfy the following basic condition:

$$\Delta x'_e \geq \Delta L_E \qquad (28)$$

Thereby, the problem of ghost image caused by different eye interval is avoided. According to Formulae (17), (23), and (28), n may be:

$$n \leq \frac{C}{2b} - \frac{P}{b} \frac{\Delta L_E}{L_V} \qquad (29)$$

Then, under the condition that the brightness ratio R' is not lowered, a larger maximum viewing range $\Delta x'_e$ without ghost image is selected, and a final value of n can be determined. The selection of the larger maximum viewing range $\Delta x'_e$ without ghost image has the same effect of reducing the width of the ghost image zone $\Delta x'_G$, thus alleviating the ghost image phenomenon generated by the wrong viewing position of the two eyes. Additionally, $\Delta x'_{BM}$ is a fixed value irrelevant to n when C/P is a constant. For example:

when C/P=0.8 and n=2, R'=0.5, $\Delta x'_e$=14 mm, $\Delta x'_{BM}$=14 mm, $\Delta x'_G$=14 mm are obtained; and when C/P=0.9 and n=3, R'=0.33, $\Delta x'_e$=21 mm, $\Delta x'_{BM}$=7 mm, $\Delta x'_G$=14 mm are obtained.

As described above, the present invention provides a parallax barrier design directed to the parameters of the sub-pixel width P, color filter width C, and black matrix width 2b on the display screen. In addition, the values of P, C, and 2b depend on the arrangement of the sub-pixels. Thus, the vertical strip parallax barrier design of the present invention is related to the arrangement of the sub-pixels on the display screen.

Figure 21:
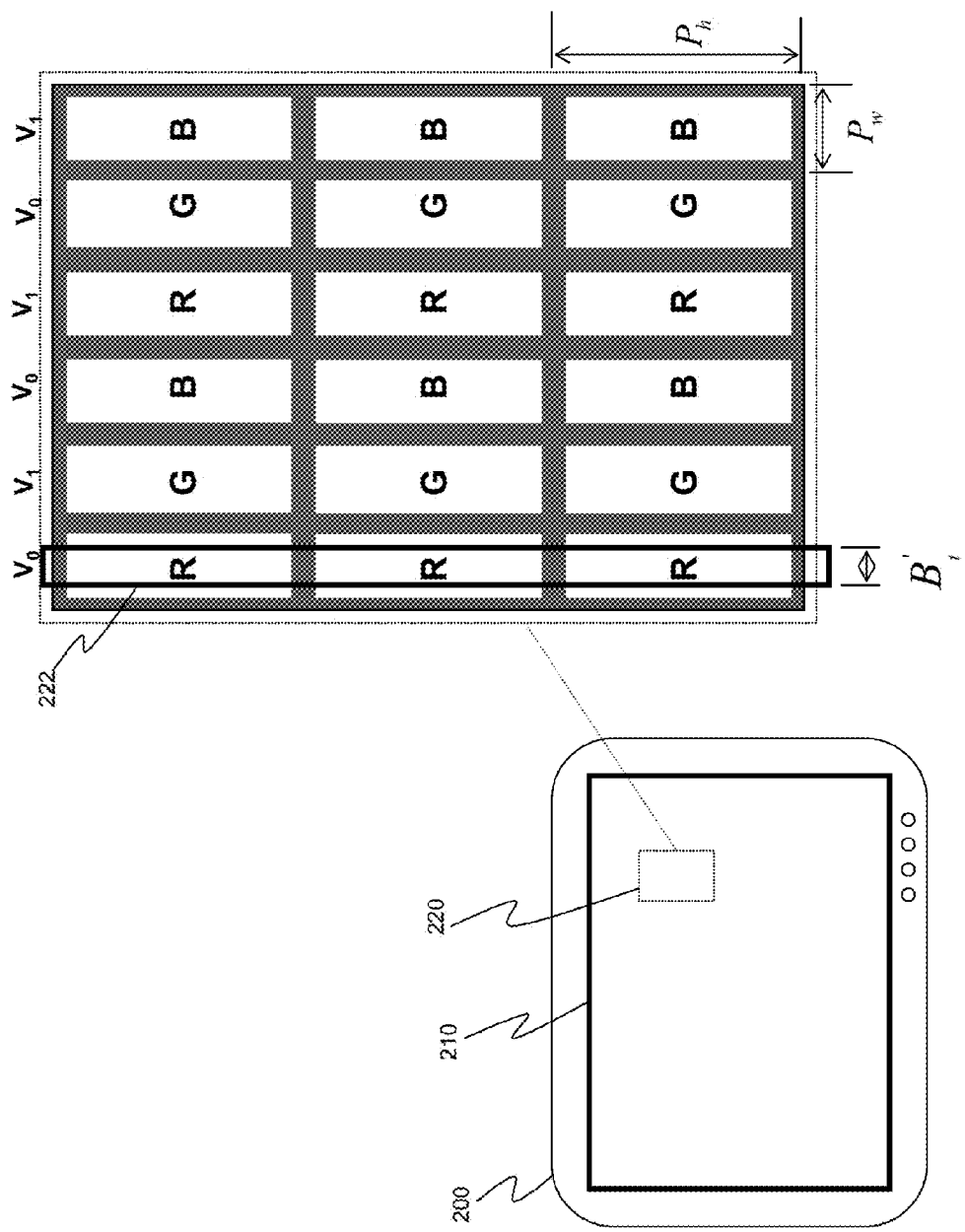
FIG. 21 is a schematic view illustrating a relation of sub-pixels in horizontal strip arrangement and an opening of the vertical strip parallax barrier.

FIG. 21 is a schematic view illustrating a relation of sub-pixels in horizontal strip arrangement and the opening of the vertical strip parallax barrier. The sub-pixels in horizontal strip arrangement are characterized in horizontal strip color distribution, i.e., R, G, B sub-pixels are sequentially arranged in a horizontal direction, and the sub-pixels of the same color are arranged in a vertical direction. Additionally, the multi-view images $V_0$, $V_1$ (e.g., 2-view) are in unit of sub-pixels and sequentially arranged in the horizontal direction. Thus, the opening of the vertical strip parallax barrier 222 of the present invention may achieve a view image separation effect in the horizontal direction for the multi-view images $V_0$, $V_1$ arranged in the horizontal direction.

Figure 22:
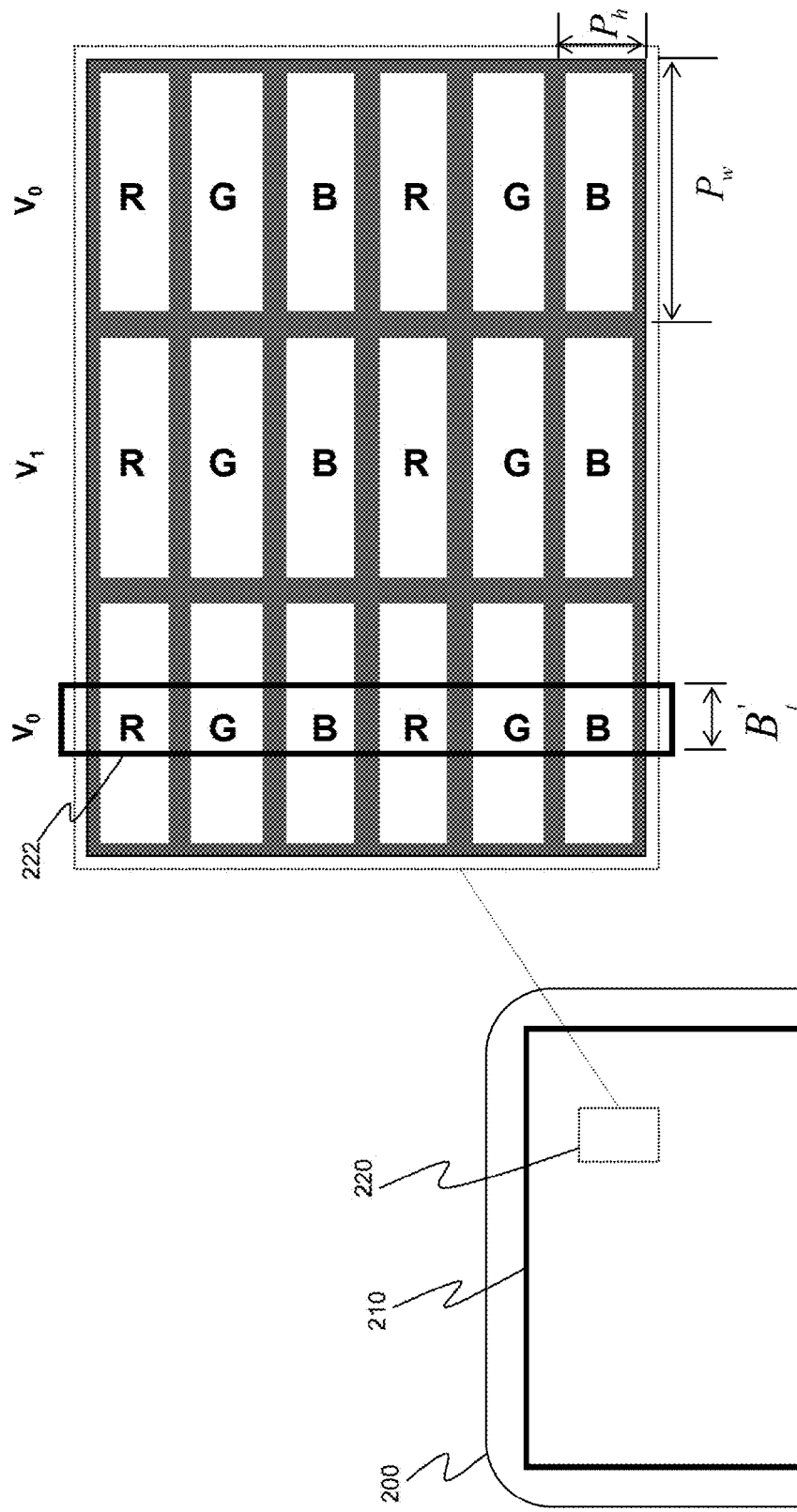
FIG. 22 is a schematic view illustrating a relation of sub-pixels in vertical strip arrangement and the opening of the vertical strip parallax barrier.

FIG. 22 is a schematic view illustrating a relation of sub-pixels in vertical strip arrangement and the opening of the vertical strip parallax barrier. The sub-pixels in vertical strip arrangement are characterized in vertical strip color distribution, i.e., R, G, B sub-pixels are sequentially arranged in a vertical direction, and the sub-pixels of the same color are arranged in a horizontal direction. Additionally, the multi-view images $V_0$, $V_1$ (e.g., 2-view) are in unit of sub-pixels and sequentially arranged in the horizontal direction. Thus, the opening of the vertical strip parallax barrier 222 of the present invention may achieve a view image separation effect in the horizontal direction for the multi-view images $V_0$, $V_1$ arranged in the horizontal direction.

Figure 23:
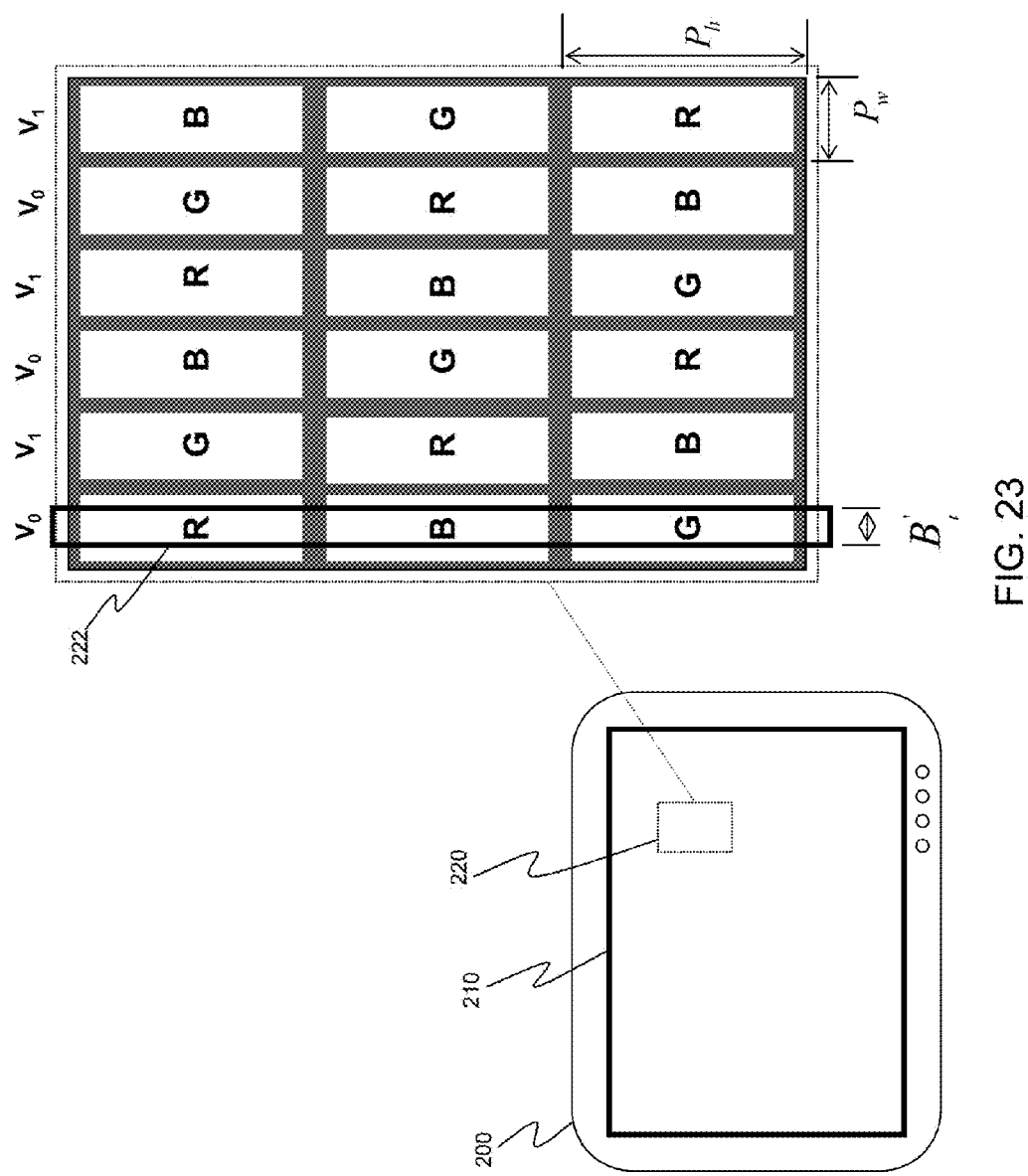
FIG. 23 is a schematic view illustrating a relation of sub-pixels in vertical Mosaic arrangement and the opening of the vertical strip parallax barrier.

FIG. 23 is a schematic view illustrating a relation of sub-pixels in vertical Mosaic arrangement and the opening of the vertical strip parallax barrier. As for the sub-pixels in vertical Mosaic arrangement, a long side $P_h$ of a single sub-pixel is disposed in a vertical direction, i.e., $P_h > P_w$. Additionally, the multi-view images $V_0$, $V_1$ (e.g., 2-view) are in unit of sub-pixels and sequentially arranged in a horizontal direction. Thus, the opening of the vertical strip parallax barrier 222 of the present invention may achieve a view image separation effect in the horizontal direction for the multi-view images $V_0$, $V_1$ arranged in the horizontal direction.

Figure 24:
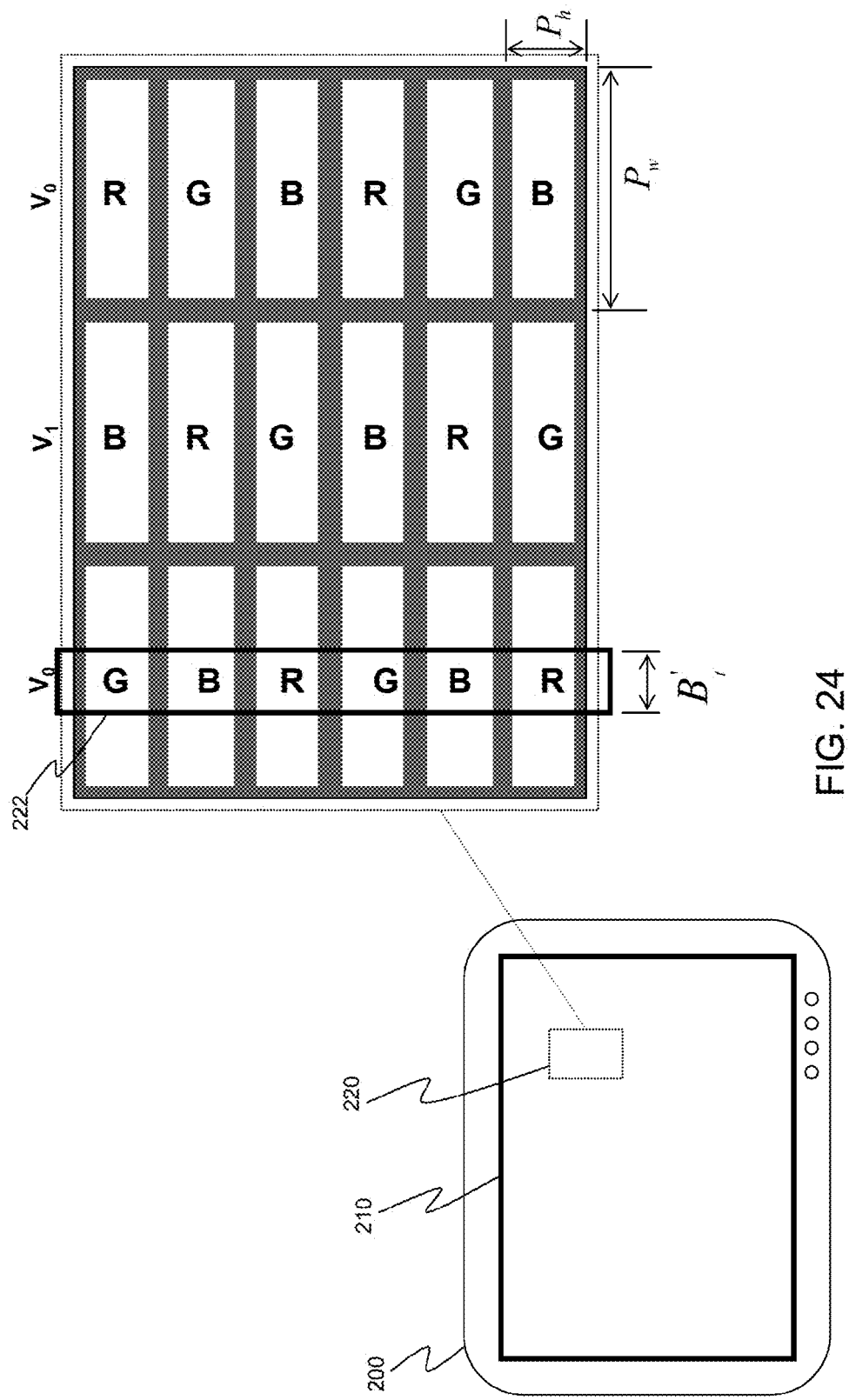
FIG. 24 is a schematic view illustrating a relation of sub-pixels in horizontal Mosaic arrangement and the opening of the vertical strip parallax barrier.

FIG. 24 is a schematic view illustrating a relation of sub-pixels in horizontal Mosaic arrangement and the opening of the vertical strip parallax barrier. As for the sub-pixels in horizontal Mosaic arrangement, a long side $P_w$ of a single sub-pixel is disposed in a horizontal direction, i.e., $P_w > P_h$. Additionally, the multi-view images $V_0$, $V_1$ (e.g., 2-view) are in unit of sub-pixels and sequentially arranged in the horizontal direction. Thus, the opening of the vertical strip parallax barrier 222 of the present invention may achieve a view image separation effect in the horizontal direction for the multi-view images $V_0$, $V_1$ arranged in the horizontal direction.

Figure 25:
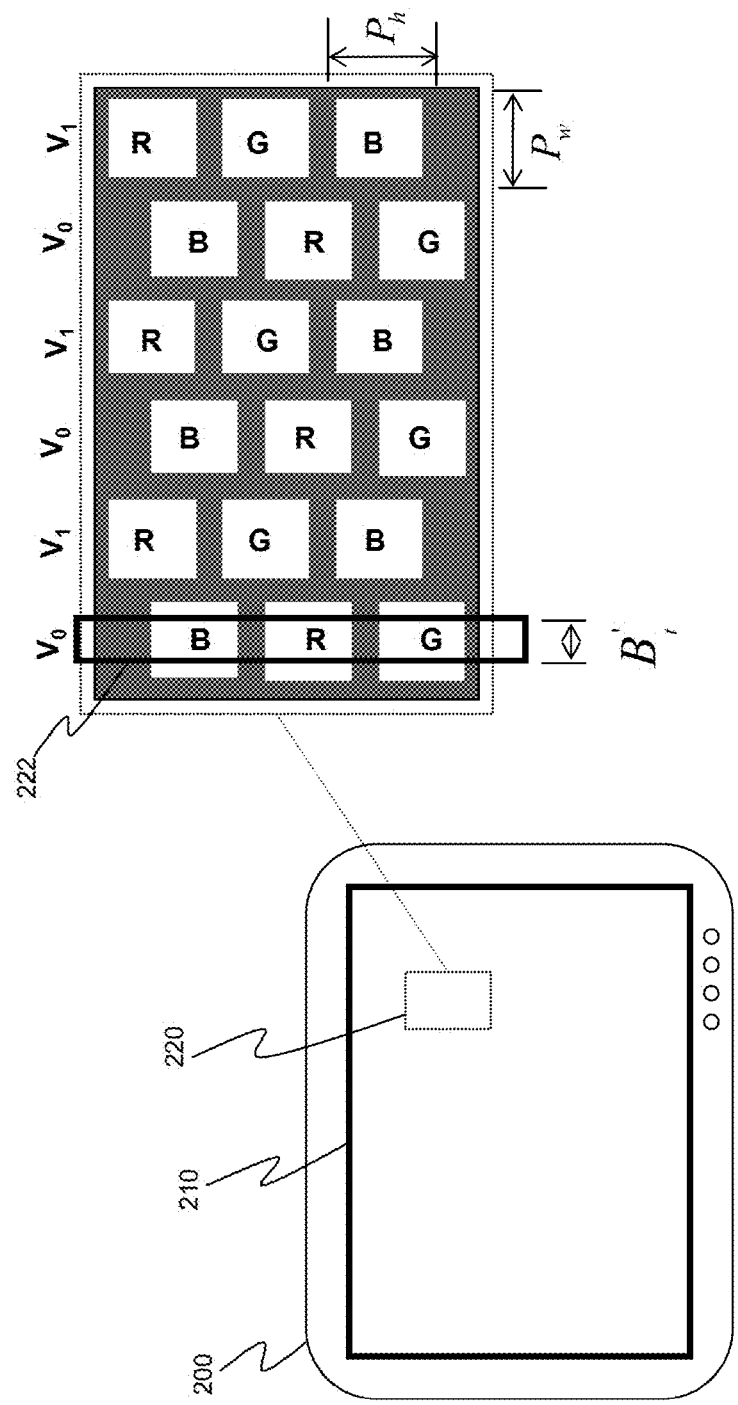
FIG. 25 is a schematic view illustrating a relation of sub-pixels in triangle arrangement and the opening of the vertical strip parallax barrier.

FIG. 25 is a schematic view illustrating a relation of sub-pixels in triangle arrangement and the opening of the vertical strip parallax barrier. The sub-pixels in triangle arrangement are characterized in vertical strip color distribution, i.e., R, G, B sub-pixels are sequentially arranged in a vertical direction. Additionally, the multi-view images $V_0$, $V_1$ (e.g., 2-view) are in unit of sub-pixels and sequentially arranged in a horizontal direction. Thus, the opening of the vertical strip parallax barrier 222 of the present invention may achieve a view image separation effect in the horizontal direction for the multi-view images $V_0$, $V_1$ arranged in the horizontal direction.

What is claimed is:

1. A parallax barrier 3D image display method, applied to reduce transverse ghost images, comprising:
providing a screen of a flat panel display formed of red green, blue (R, G, B) sub-pixel units, wherein a single sub-pixel unit is formed of a color filter and a black matrix, a horizontal width of the single sub-pixel unit is P, a horizontal width of the color filter is C, and a horizontal width of the black matrix is 2b, P=C+2b, and a multi-view 3D image is displayed on the screen of the flat panel display in unit of sub-pixels; and
providing a vertical strip parallax barrier formed of vertical strip light-transmissive elements and vertical strip shielding elements arranged alternately, wherein a horizontal width of a single vertical strip light-transmissive element is $B'_t$, and a horizontal width of a single vertical strip shielding element is $\overline{B^r_t}$; the vertical strip parallax barrier is installed in the front of the screen of the flat panel display at an installation distance $L_B$, and completely separates a view image of the multi-view 3D image at multiple best viewing points on an optimum viewing distance $Z_0$;
wherein a design value of the horizontal width $B'_t$ of the light-transmissive element is calculated through the following formula:

$$B'_t = n\left(1 - \frac{C}{P}\right)B_0,$$

a design value of the horizontal width $\overline{B^r_t}$ of the shielding element is calculated through the following formula:

$$\overline{B^r_t} = \left[N - n\left(1 - \frac{C}{P}\right)\right]B_0,$$

n is an opening enlarging factor and is a positive real number satisfying
$1 \leq n \leq C/2b$ and $$n \leq \frac{C}{2b} - \frac{P}{b}\frac{\Delta L_E}{L_V},$$

where $\Delta L_E$ is a distribution deviation of eye interval,
N is a total view number and is a positive integer satisfying N>2;
$B_0$ is calculated through the following formula:

$$B_0 = \frac{L_V}{P + L_V}P,$$

$L_v$ is a distance between the best viewing points.

2. The parallax barrier 3D image display method according to claim 1, wherein $L_v$ is set to be an average interval of two eyes.

3. The parallax barrier 3D image display method according to claim 1, wherein the distribution deviation of eye interval $\Delta L_E$ is set to be $\Delta L_E \geq 5$ mm.

4. The parallax barrier 3D image display method according to claim 1, wherein the installation distance $L_B$ and the optimum viewing distance $Z_0$ has a relation as expressed in the following formula:

$$Z_0 = \frac{P}{P - B_0}L_B.$$

5. The parallax barrier 3D image display method according to claim 1, wherein the R, G, B sub-pixels are in horizontal strip arrangement, characterized in horizontal strip color distribution, wherein the R, G, B sub-pixels are sequentially arranged in a horizontal direction, and the sub-pixels of the same color are arranged in a vertical direction.

6. The parallax barrier 3D image display method according to claim 1, wherein the R, G, B sub-pixels are in vertical strip arrangement, characterize in vertical strip color distribution, wherein the R, G, B sub-pixels are sequentially arranged in a vertical direction, and the sub-pixels of the same color are arranged in a horizontal direction.

7. The parallax barrier 3D image display method according to claim 1, wherein the R, G, B sub-pixels are in vertical Mosaic arrangement, such that a long side of a single sub-pixel is disposed in parallel to a vertical direction.

8. The parallax barrier 3D image display method according to claim 1, wherein the R, G, B sub-pixels are in horizontal Mosaic arrangement, such that a long side of a single sub-pixel is disposed in parallel to a horizontal direction.

9. The parallax barrier 3D image display method according to claim 1, wherein the R, G, B sub-pixels are in triangle arrangement, characterized in vertical strip color distribution, wherein the R, G, B sub-pixels are sequentially arranged in a vertical direction.

* * * * *